(12) United States Patent
Gao et al.

(10) Patent No.: US 12,414,128 B2
(45) Date of Patent: Sep. 9, 2025

(54) SYSTEMS AND METHODS FOR DETERMINING TCI STATES FOR MULTIPLE TRANSMISSION OCCASIONS

(71) Applicant: Telefonaktiebolaget LM Ericsson (publ), Stockholm (SE)

(72) Inventors: Shiwei Gao, Nepean (CA); Siva Muruganathan, Stittsville (CA); Mattias Frenne, Uppsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 430 days.

(21) Appl. No.: 17/917,957

(22) PCT Filed: Apr. 12, 2021

(86) PCT No.: PCT/IB2021/053024
§ 371 (c)(1),
(2) Date: Oct. 10, 2022

(87) PCT Pub. No.: WO2021/205421
PCT Pub. Date: Oct. 14, 2021

(65) Prior Publication Data
US 2023/0127381 A1    Apr. 27, 2023

Related U.S. Application Data

(60) Provisional application No. 63/008,389, filed on Apr. 10, 2020.

(51) Int. Cl.
*H04W 72/23*   (2023.01)
*H04W 72/1273*  (2023.01)
(52) U.S. Cl.
CPC ....... *H04W 72/23* (2023.01); *H04W 72/1273* (2013.01)

(58) Field of Classification Search
CPC ............................. H04W 72/23; H04W 12/73
(Continued)

(56) References Cited

U.S. PATENT DOCUMENTS

2019/0141693 A1\*   5/2019   Guo .................. H04B 7/088
2019/0281587 A1    9/2019   Zhang et al.
(Continued)

FOREIGN PATENT DOCUMENTS

EP    3606243 A1    2/2020
EP    3820052 A1    5/2021
(Continued)

OTHER PUBLICATIONS

AT&T, et al., "R1-2000930: RAN1 UE features list for Rel-16 NR," 3GPP TSG RAN WG1 #100-e, Feb. 24-Mar. 6, 2020, e-meeting, 157 pages.
(Continued)

*Primary Examiner* — Sibte H Bukhari
(74) *Attorney, Agent, or Firm* — Withrow & Terranova, PLLC

(57) ABSTRACT

Systems and methods for determining Transmission Configuration Indication (TCI) states for multiple transmission occasions are provided. In some embodiments, a method performed by a wireless device includes: receiving a configuration including: a list of TCI states; a TCI activation command in activating a subset of the TCI states and mapping between each of the codepoints to activated TCI states; and a time threshold; receiving in a slot a scheduling message scheduling the transmission occasions; determining time offsets between receiving the scheduling message and each transmission occasion; determining a TCI state for each transmission occasion if at least one time offset is less than the time threshold; and receiving the transmission occasions with the determined TCI states. The proposed solutions
(Continued)

ensure consistent UE behavior and allow for more robust PDSCH transmission over multiple TRPs.

18 Claims, 22 Drawing Sheets

(58) Field of Classification Search
USPC .......................................................... 370/329
See application file for complete search history.

(56) References Cited

U.S. PATENT DOCUMENTS

| | | | |
|---|---|---|---|
| 2019/0297637 A1* | 9/2019 | Liou | H04W 72/1273 |
| 2019/0342907 A1 | 11/2019 | Huang et al. | |
| 2019/0373450 A1 | 12/2019 | Zhou et al. | |
| 2020/0052844 A1 | 2/2020 | Yu et al. | |
| 2020/0077369 A1 | 3/2020 | Zhang et al. | |
| 2020/0077395 A1 | 3/2020 | Guo | |
| 2020/0221485 A1* | 7/2020 | Cirik | H04L 25/0224 |

FOREIGN PATENT DOCUMENTS

| | | | |
|---|---|---|---|
| WO | 2019215895 A1 | 11/2019 | |
| WO | 2020017905 A1 | 1/2020 | |

OTHER PUBLICATIONS

Huawei, et al., "R1-1911425: Feature Summary of Enhancements on Multi-TRP/Panel Transmission," 3GPP TSG RAN WG1 Meeting #98bis, Oct. 14-20, 2019, Chongqing, China, 100 pages.
International Search Report and Written Opinion for International Patent Application No. PCT/IB2021/053024, mailed Jul. 26, 2021, 21 pages.
Written Opinion for International Patent Application No. PCT/IB2021/053024, mailed Mar. 9, 2022, 13 pages.
International Preliminary Report on Patentability for International Patent Application No. PCT/IB2021/053024, mailed Jul. 8, 2022, 43 pages.
Author Unknown, "Technical Specification Group Radio Access Network; NR; Physical layer procedures for data (Release 16)," Technical Specification 38.214, Version 16.1.0, Mar. 2020, 3GPP Organizational Partners, 151 pages.
ZTE, "R1-1906257: Clarification on the case of configured TCI states without QCL-TypeD," 3GPP TSG RAN WG1 Meeting #97, May 13-17, 2019, Reno, Nevada, 3 pages.
First Office Action for Chinese Patent Application No. 202180041456.0, mailed May 16, 2024, 49 pages.
Second Office Action for Chinese Patent Application No. 202180041456.0, mailed Jan. 20, 2025, 8 pages.

* cited by examiner

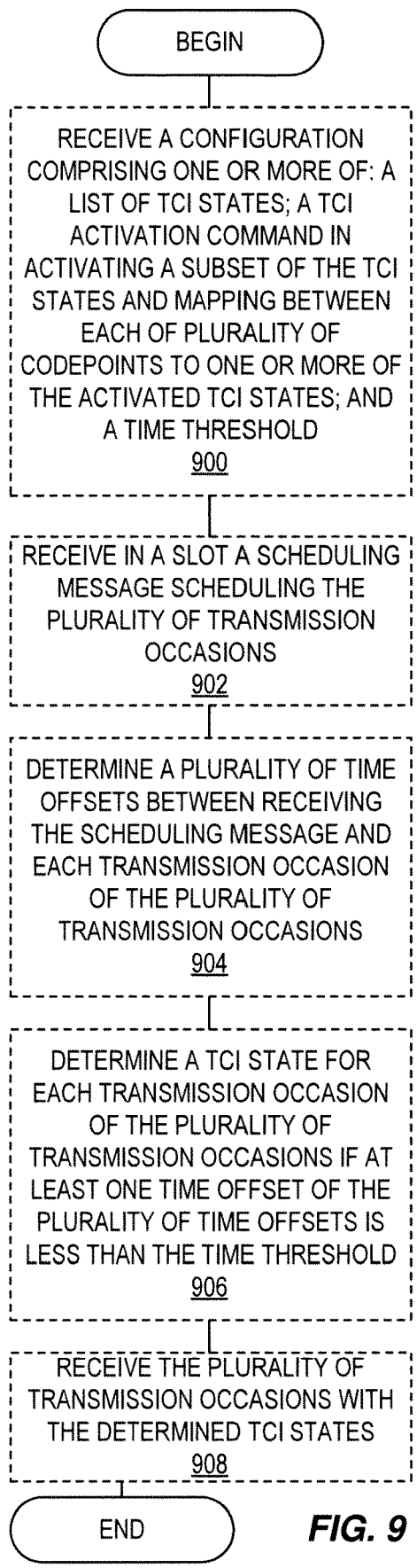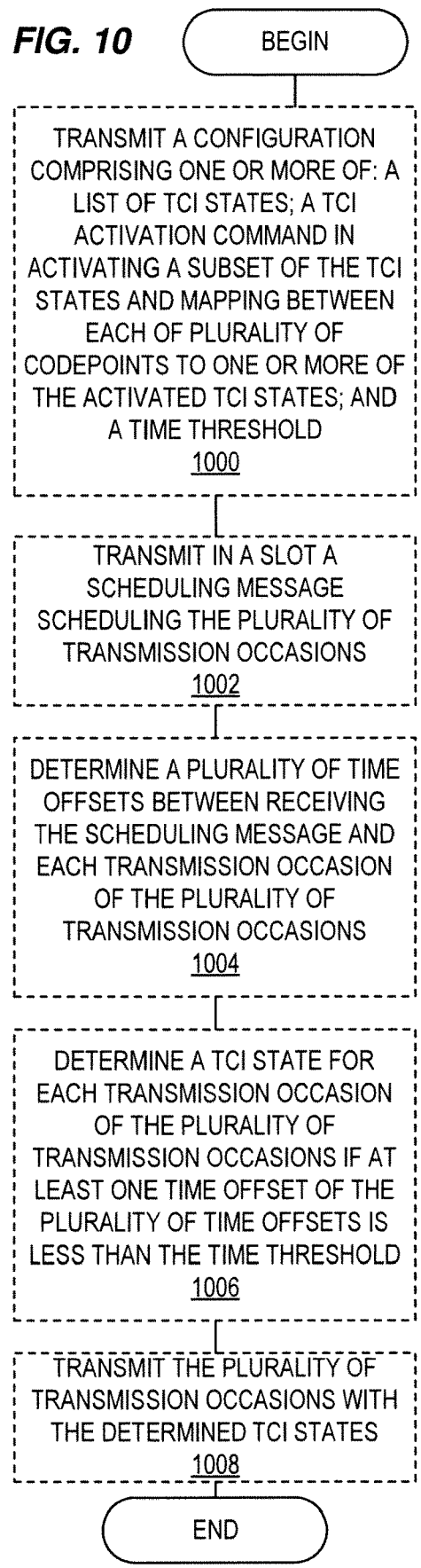
FIG. 9
FIG. 10

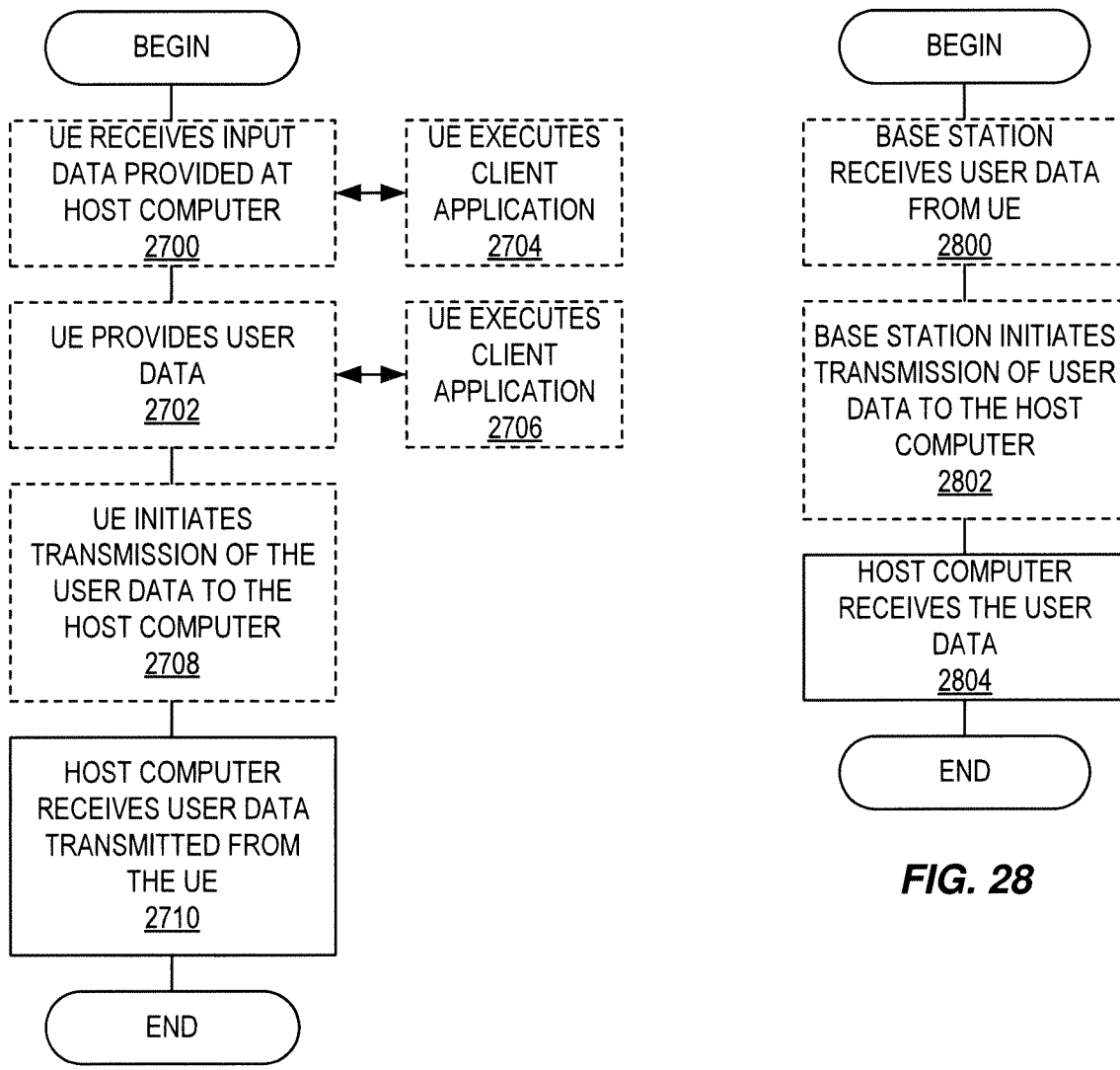

SYSTEMS AND METHODS FOR DETERMINING TCI STATES FOR MULTIPLE TRANSMISSION OCCASIONS

RELATED APPLICATIONS

This application is a 35 U.S.C. § 371 national phase filing of International Application No. PCT/IB2021/053024, filed Apr. 12, 2021, which claims the benefit of provisional patent application Ser. No. 63/008,389, filed Apr. 10, 2020, the disclosures of which are hereby incorporated herein by reference in its entirety their entireties.

TECHNICAL FIELD

The present disclosure related to determining Transmission Configuration Indication (TCI) states.

BACKGROUND

NR uses Cyclic Prefix Orthogonal Frequency Division Multiplexing (CP-OFDM) in both Downlink (DL) (i.e., from a network node, gNB, or base station, to a User Equipment or UE) and Uplink (UL) (i.e., from UE to gNB). DFT spread OFDM is also supported in the uplink. In the time domain, NR downlink and uplink are organized into equally sized subframes of 1 ms each. A subframe is further divided into multiple slots of equal duration. The slot length depends on subcarrier spacing. For subcarrier spacing of $\Delta_f=15$ kHz, there is only one slot per subframe, and each slot consists of 14 OFDM symbols.

Data scheduling in NR is typically in slot basis, an example is shown in FIG. 1 with a 14-symbol slot, where the first two symbols contain Physical Downlink Control Channel (PDCCH) and the rest contains physical shared data channel, either Physical Downlink Shared Channel (PDSCH) or Physical Uplink Shared Channel (PUSCH).

Different subcarrier spacing values are supported in NR. The supported subcarrier spacing values (also referred to as different numerologies) are given by $\Delta f=(15\times2^\mu)$ kHz where $\mu \in \{0, 1, 2, 3, 4\}$. $\Delta f=15$ kHz is the basic subcarrier spacing. The slot durations at different subcarrier spacing is given by $$\frac{1}{2^\mu} \text{ms}.$$

In the frequency domain, a system bandwidth is divided into Resource Blocks (RBs), each corresponds to 12 contiguous subcarriers. The RBs are numbered starting with 0 from one end of the system bandwidth. The basic NR physical time-frequency resource grid is illustrated in FIG. 2, where only one RB within a 14-symbol slot is shown. One OFDM subcarrier during one OFDM symbol interval forms one Resource Element (RE).

Downlink transmissions can be dynamically scheduled, i.e., in each slot the gNB transmits Downlink Control Information (DCI) over PDCCH about which UE data is to be transmitted to and which RBs and OFDM symbols in the current downlink slot the data is transmitted on. PDCCH is typically transmitted in the first few OFDM symbols in each slot in NR. The UE data are carried on PDSCH.

There are three DCI formats defined for scheduling PDSCH in NR, i.e., DCI format 1_0, DCI format 1_1, and DCI format 1_2. DCI format 1_0 has a smaller size than DCI 1_1 and can be used when a UE is not connected to the network while DCI format 1_1 can be used for scheduling MIMO (Multiple-Input-Multiple-Output) transmissions with up to 2 transport blocks (TBs). DCI format 1_2 is introduced in NR Release 16 (Rel-16) to support configurable size for certain bit fields in the DCI.

One or more of the following bit fields may be included in a DCI:
Frequency Domain Resource Assignment (FDRA)
Time Domain Resource Assignment (TDRA)
Modulation and coding scheme (MCS)
New Data Indicator (NDI)
Redundancy Version (RV)
HARQ process number
PUCCH Resource Indicator (PRI)
PDSCH-to-HARQ_feedback timing indicator (K1)
Antenna port(s)
Transmission Configuration Indication (TCI)

A UE first detects and decodes PDCCH and if the decoding is successful, it then decodes the corresponding PDSCH based on the decoded DCI carried in the PDCCH. The PDSCH decoding status is sent back to the gNB in the form of HARQ Acknowledgment in a PUCCH resource indicated by PRI. An example is illustrated in FIG. 3. The time offset, T1, between the reception of the DL DCI and the corresponding PDSCH determined by a slot offset and starting symbol of the PDSCH indicated in TDRA in the DCI. The time offset, T2, between the reception of the DL DCI and the corresponding HARQ ACK is provided by the PDSCH-to-HARQ_feedback timing indicator in the DCI.

Time Domain Resource Allocation

When the UE is scheduled to receive PDSCH by a DCI, the Time domain resource (TDRA) assignment field value m of the DCI provides a row index m+1 to a time domain resource allocation table. When a DCI is detected, the PDSCH time domain resource allocation is according to an RRC configured TDRA list (i.e., a table of TDRA entries) by an RRC parameter pdsch-TimeDomainAllocationList provided in a UE specific PDSCH configuration, pdsch-Config. Each TDRA entry in the TDRA list defines a slot offset K0 between the PDSCH and the PDCCH scheduling the PDSCH, a start and length indicator SLIV, the PDSCH mapping type (either Type A or Type B) to be assumed in the PDSCH reception, and optionally a repetition number RepNumR16.

TCI States

Demodulation Reference Signals (DM-RS) are used for coherent demodulation of PDSCH. The DM-RS is confined to resource blocks carrying the associated PDSCH and is mapped on allocated Resource Elements (REs) of the OFDM time-frequency grid in NR such that the receiver can efficiently handle time/frequency-selective fading radio channels. A PDSCH can have one or multiple DMRS, each associated with an antenna port. The antenna ports used for PDSCH are indicated in DCI scheduling the PDSCH.

Several signals can be transmitted from different antenna ports in a same physical location. These signals can have the same large-scale properties, for instance in terms of Doppler shift/spread, average delay spread, or average delay, when measured at the receiver. These antenna ports are then said to be quasi co-located (QCL). The network can then signal to the UE that two antenna ports are QCL. If the UE knows that two antenna ports are QCL with respect to a certain parameter (e.g., Doppler spread), the UE can estimate that parameter based on a reference signal transmitted one of the antenna ports and use that estimate when receiving another reference signal or physical channel the other antenna port. Typically, the first antenna port is represented by a measurement reference signal such as channel state information reference signal (CSI-RS) (known as a source RS) and the second antenna port is a DMRS (known as a target RS) for PDSCH reception.

In NR, a QCL relationship between a Demodulation Reference Signal (DMRS) in PDSCH and other reference signals is described by a TCI state. A UE can be configured through RRC signaling with up to 128 TCI states in Frequency Range 2 (FR2) and up to 8 TCI states in FR1, depending on UE capability. Each TCI state contains QCL information, for the purpose of PDSCH reception. A UE can be dynamically signaled one or two TCI states in the TCI field in a DCI scheduling a PDSCH.

A QCL relationship between a DMRS in PDCCH and other reference signals is described by a TCI state of a Control Resource Set (CORESET) over which the PDCCH is transmitted. For each CORESET configured to a UE, a list of TCI states is RRC configured, one of them is activated by a MAC CE. In NR Rel-15, up to three CORESETs per Bandwidth Part (BWP) can be configured for a UE. In NR Rel-16, up to five CORESETs per BWP may be configured to a UE, depending on UE capability.

Improved systems and methods are needed for determining TCI states.

SUMMARY

Systems and methods for determining Transmission Configuration Indication (TCI) states for multiple transmission occasions are provided. In some embodiments, a method performed by a wireless device for determining TCI states for a plurality of transmission occasions includes one or more of: receiving a configuration, where the configuration comprises one or more of: a list of TCI states; a TCI activation command in activating a subset of the TCI states and mapping between each of plurality of codepoints to one or more of the activated TCI states; and a time threshold; receiving in a slot a scheduling message scheduling the plurality of transmission occasions; determining a plurality of time offsets between receiving the scheduling message and each transmission occasion of the plurality of transmission occasions; determining a TCI state for each transmission occasion of the plurality of transmission occasions if at least one time offset of the plurality of time offsets is less than the time threshold; and receiving the plurality of transmission occasions with the determined TCI states. The proposed solutions ensure consistent UE behavior and allow for more robust PDSCH transmission over multiple TRPs. In some embodiments, a method performed by a base station for determining TCI states for a plurality of transmission occasions includes one or more of: transmitting a configuration to a wireless device, where the configuration comprises one or more of: a list of TCI states; a TCI activation command in activating a subset of the TCI states and mapping between each of plurality of codepoints to one or more of the activated TCI states; and a time threshold; transmitting, to the wireless device, in a slot a scheduling message scheduling the plurality of transmission occasions; determining a plurality of time offsets between receiving the scheduling message and each transmission occasion of the plurality of transmission occasions; determining a TCI state for each transmission occasion of the plurality of transmission occasions if at least one time offset of the plurality of time offsets is less than the time threshold; and transmitting, to the wireless device, the plurality of transmission occasions with the determined TCI states. The proposed solutions ensure consistent UE behavior and allow for more robust PDSCH transmission over multiple TRPs.

Methods are proposed to define the UE behavior when the time offset between the reception of a DL DCI and a subset of PDSCH occasions is less than the threshold timeDurationForQCL while the time offset between the reception of a DL DCI and a second subset of PDSCH occasions is greater than the threshold timeDurationForQCL.

In some embodiments, the scheduling message scheduling the plurality of transmission occasions comprises a DCI scheduling the plurality of transmission occasions. In some embodiments, the multiple transmission occasions comprise multiple PDSCH transmission occasions.

In some embodiments, the method also includes determining a first time offset and a second time offset, wherein the first time offset is below the time threshold and the second time offset is equal or greater than the time threshold.

In some embodiments, the method also includes determining one or two default TCI state based on the codepoint to TCI state(s) mapping in the activation command.

In some embodiments, the DCI indicates one or more TCI state for the PDSCH transmission occasions. In some embodiments, one or more default TCI state is applied to PDSCH occasions associated to the first time offset and the one or more indicated TCI state is applied to PDSCH occasions associated to the second time offset.

In some embodiments, if two default TCI states, a first and a second default TCI state, are determined, the first default TCI state and the second TCI state are applied to the PDSCH occasions associated to the first time offset exists alternately every one or two PDSCH occasions.

In some embodiments, if two TCI states, a first and a second indicated TCI state, are indicated in the DCI, the first indicated TCI state and the second indicated TCI states are applied to PDSCH occasions associated to the second time offset alternately every one or two PDSCH occasions starting from the first indicated TCI state.

In some embodiments, if two TCI states, a first and a second indicated TCI state, are indicated in the DCI, the first indicated TCI state and the second indicated TCI states are applied to PDSCH occasions associated to the second time offset in a same order as if the first time offset does not exist.

In some embodiments, one or more default TCI state is applied to all PDSCH occasions if the first time offset exists.

In some embodiments, if two default TCI states, a first and a second default TCI state, are determined, the first default TCI state and the second TCI state are applied to the PDSCH occasions alternately every one or two PDSCH occasions.

Certain embodiments may provide one or more of the following technical advantage(s). The proposed solutions ensure consistent UE behavior and allow for more robust PDSCH transmission over multiple TRPs.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 9 illustrates a method performed by a wireless device for determining TCI states for a plurality of transmission occasions according to some embodiments of the present disclosure;

FIG. 10 illustrates a method performed by a base station for determining TCI states for a plurality of transmission occasions according to some embodiments of the present disclosure;

FIG. 27 is a flowchart illustrating a method implemented in a communication system, in accordance with one embodiment; and FIG. 28 is a flowchart illustrating a method implemented in a communication system, in accordance with one embodiment.

DETAILED DESCRIPTION

Figure 1:
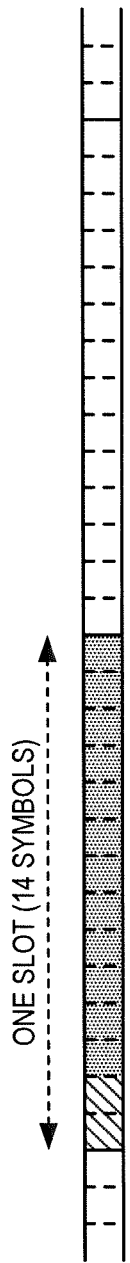
FIG. 1 illustrates an example data scheduling in New Radio (NR) which is typically in slot basis with a 14-symbol slot, where the first two symbols contain Physical Downlink Control Channel (PDCCH) and the rest contains physical shared data channel, either Physical Downlink Shared Channel (PDSCH) or Physical Uplink Shared Channel (PUSCH)
Figure 2:
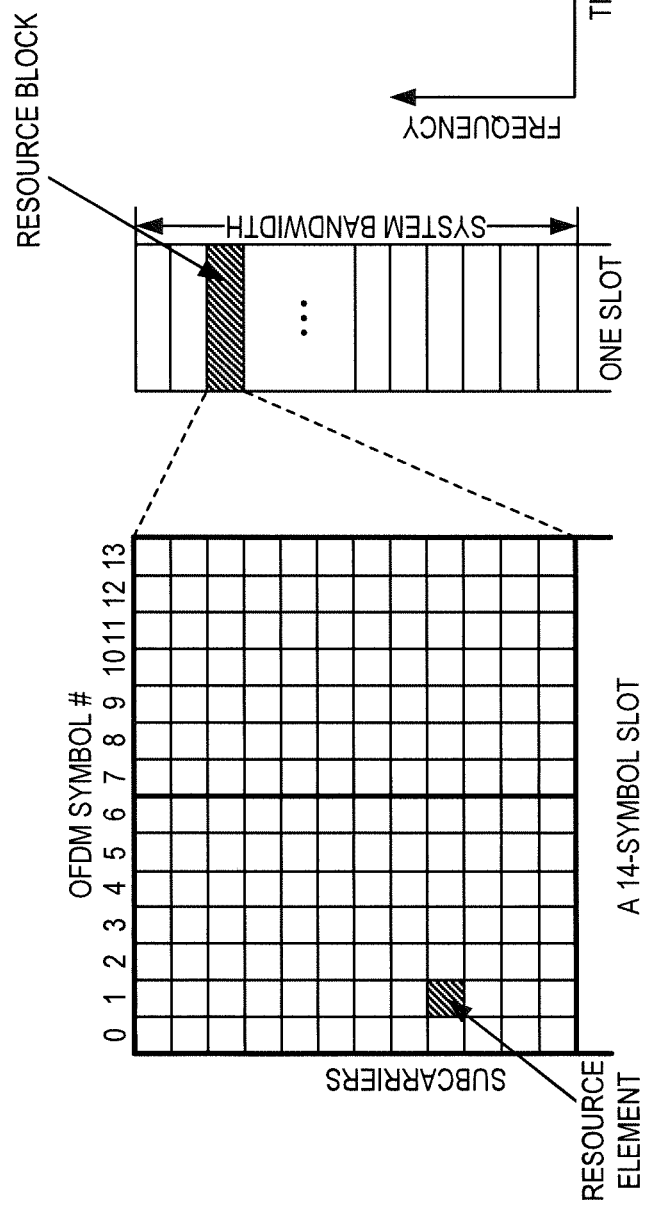
FIG. 2 illustrates the basic NR physical time-frequency resource grid where only one RB within a 14-symbol slot is shown.
Figure 3:
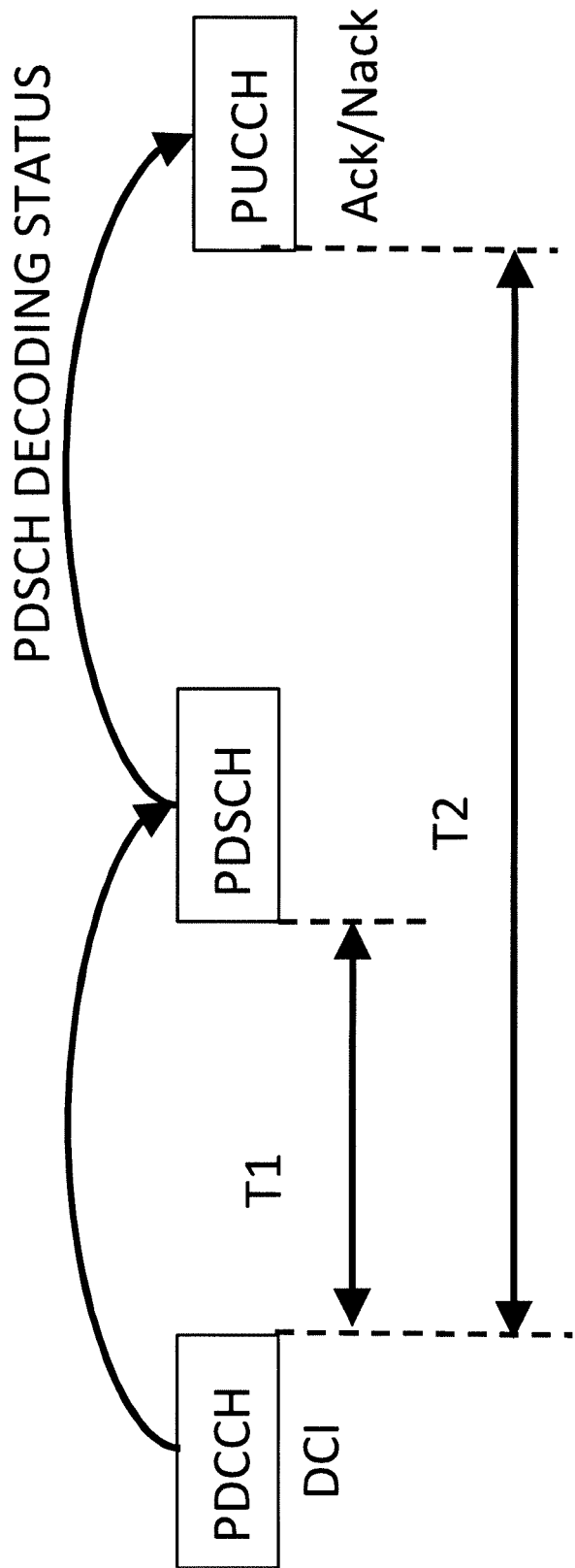
FIG. 3 illustrates a PDSCH decoding status is sent back to the gNB in the form of HARQ Acknowledgment.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless communication device.

Radio Access Node: As used herein, a "radio access node" or "radio network node" or "radio access network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), a relay node, a network node that implements part of the functionality of a base station (e.g., a network node that implements a gNB Central Unit (gNB-CU) or a network node that implements a gNB Distributed Unit (gNB-DU)) or a network node that implements part of the functionality of some other type of radio access node.

Core Network Node: As used herein, a "core network node" is any type of node in a core network or any node that implements a core network function. Some examples of a core network node include, e.g., a Mobility Management Entity (MME), a Packet Data Network Gateway (P-GW), a Service Capability Exposure Function (SCEF), a Home Subscriber Server (HSS), or the like. Some other examples of a core network node include a node implementing a Access and Mobility Management Function (AMF), a User Plane Function (UPF), a Session Management Function (SMF), an Authentication Server Function (AUSF), a Network Slice Selection Function (NSSF), a Network Exposure Function (NEF), a Network Function (NF) Repository Function (NRF), a Policy Control Function (PCF), a Unified Data Management (UDM), or the like.

Communication Device: As used herein, a "communication device" is any type of device that has access to an access network. Some examples of a communication device include, but are not limited to: mobile phone, smart phone, sensor device, meter, vehicle, household appliance, medical appliance, media player, camera, or any type of consumer electronic, for instance, but not limited to, a television, radio, lighting arrangement, tablet computer, laptop, or Personal Computer (PC). The communication device may be a portable, hand-held, computer-comprised, or vehicle-mounted mobile device, enabled to communicate voice and/or data via a wireless or wireline connection.

Wireless Communication Device: One type of communication device is a wireless communication device, which may be any type of wireless device that has access to (i.e., is served by) a wireless network (e.g., a cellular network). Some examples of a wireless communication device include, but are not limited to: a User Equipment device (UE) in a 3GPP network, a Machine Type Communication (MTC) device, and an Internet of Things (IoT) device. Such wireless communication devices may be, or may be integrated into, a mobile phone, smart phone, sensor device, meter, vehicle, household appliance, medical appliance, media player, camera, or any type of consumer electronic, for instance, but not limited to, a television, radio, lighting arrangement, tablet computer, laptop, or PC. The wireless communication device may be a portable, hand-held, computer-comprised, or vehicle-mounted mobile device, enabled to communicate voice and/or data via a wireless connection.

Network Node: As used herein, a "network node" is any node that is either part of the RAN or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

Figure 4:
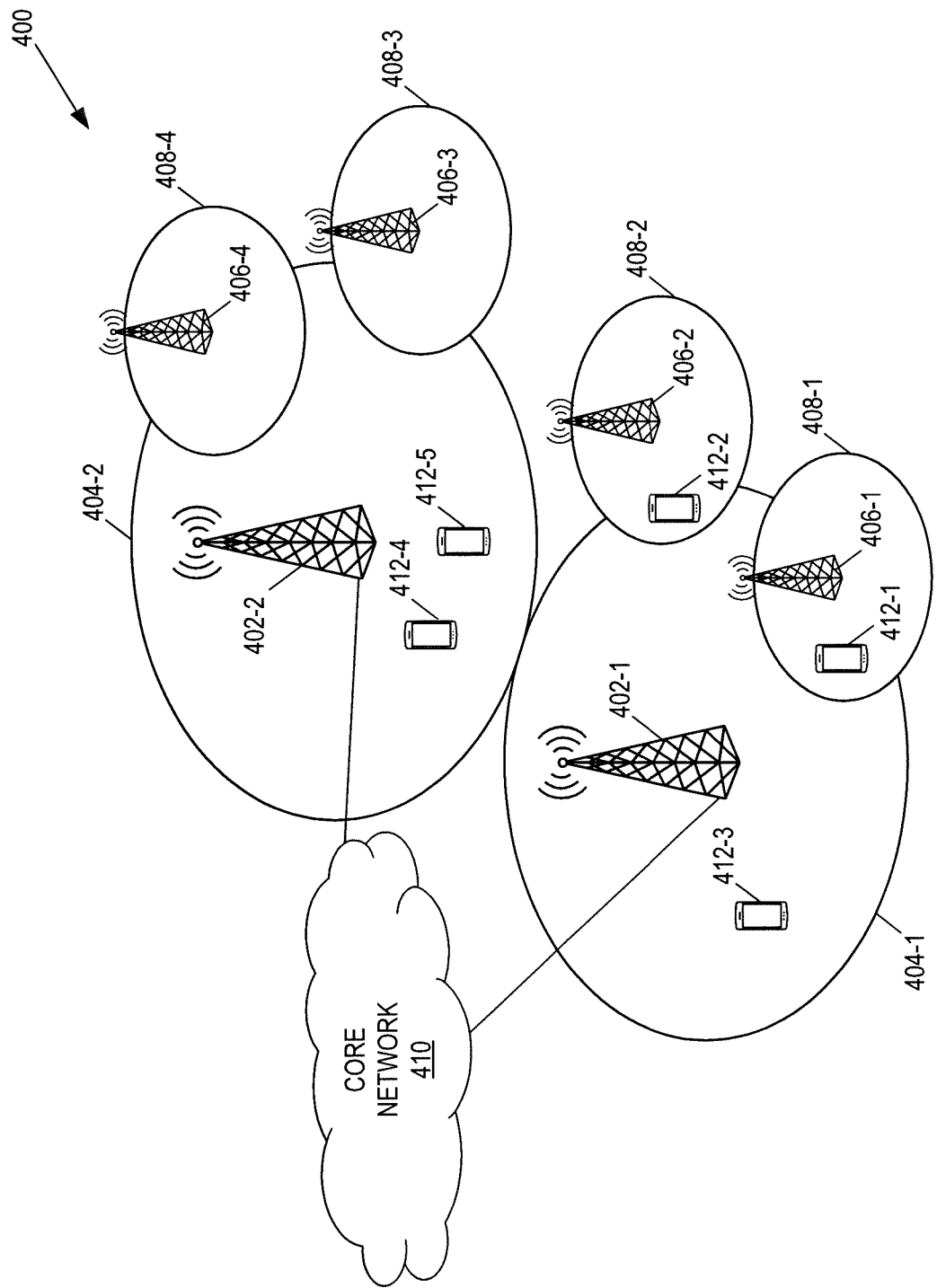
FIG. 4 illustrates one example of a cellular communications system in which embodiments of the present disclosure may be implemented.

FIG. 4 illustrates one example of a cellular communications system 400 in which embodiments of the present disclosure may be implemented. In the embodiments described herein, the cellular communications system 400 is a 5G System (5GS) including a NR RAN or LTE RAN (i.e., Evolved Universal Terrestrial Radio Access (E-UTRA) RAN). In this example, the RAN includes base stations 402-1 and 402-2, which in 5G NR are referred to as gNBs (e.g., LTE RAN nodes connected to 5G Core (5GC), which are referred to as gn-eNBs), controlling corresponding (macro) cells 404-1 and 404-2. The base stations 402-1 and 402-2 are generally referred to herein collectively as base stations 402 and individually as base station 402. Likewise, the (macro) cells 404-1 and 404-2 are generally referred to herein collectively as (macro) cells 404 and individually as (macro) cell 404. The RAN may also include a number of low power nodes 406-1 through 406-4 controlling corresponding small cells 408-1 through 408-4. The low power nodes 406-1 through 406-4 can be small base stations (such as pico or femto base stations) or Remote Radio Heads (RRHs), or the like. Notably, while not illustrated, one or more of the small cells 408-1 through 408-4 may alternatively be provided by the base stations 402. The low power nodes 406-1 through 406-4 are generally referred to herein collectively as low power nodes 406 and individually as low power node 406. Likewise, the small cells 408-1 through 408-4 are generally referred to herein collectively as small cells 408 and individually as small cell 408. The cellular communications system 400 also includes a core network 410, which in the 5GS is referred to as the 5G Core (5GC). The base stations 402 (and optionally the low power nodes 406) are connected to the core network 410.

The base stations 402 and the low power nodes 406 provide service to wireless communication devices 412-1 through 412-5 in the corresponding cells 404 and 408. The wireless communication devices 412-1 through 412-5 are generally referred to herein collectively as wireless communication devices 412 and individually as wireless communication device 412. In the following description, the wireless communication devices 412 are oftentimes UEs, but the present disclosure is not limited thereto.

PDSCH Repetition Schemes

NR Rel-15 Multi-Slot PDSCH Transmission

For dynamically scheduled PDSCH by DCI format 1_1 or 1_2 in PDCCH with CRC (Cyclic Redundancy Check) scrambled by C-RNTI, MCS-C-RNTI, or CS-RNTI, if the UE is configured with a RRC parameter pdsch-AggregationFactor, the same PDSCH symbol allocation is applied across a number of consecutive slots. The number is given by the value of pdsch-AggregationFactor.

For Semi-Persistent Scheduled (SPS) PDSCH configured by RRC parameter sps-Config and activated by DCI format 1_1 or 1_2, if pdsch-AggregationFactor is present in sps-Config, the same symbol allocation is applied across the pdsch-AggregationFactor consecutive slots.

Figure 5:
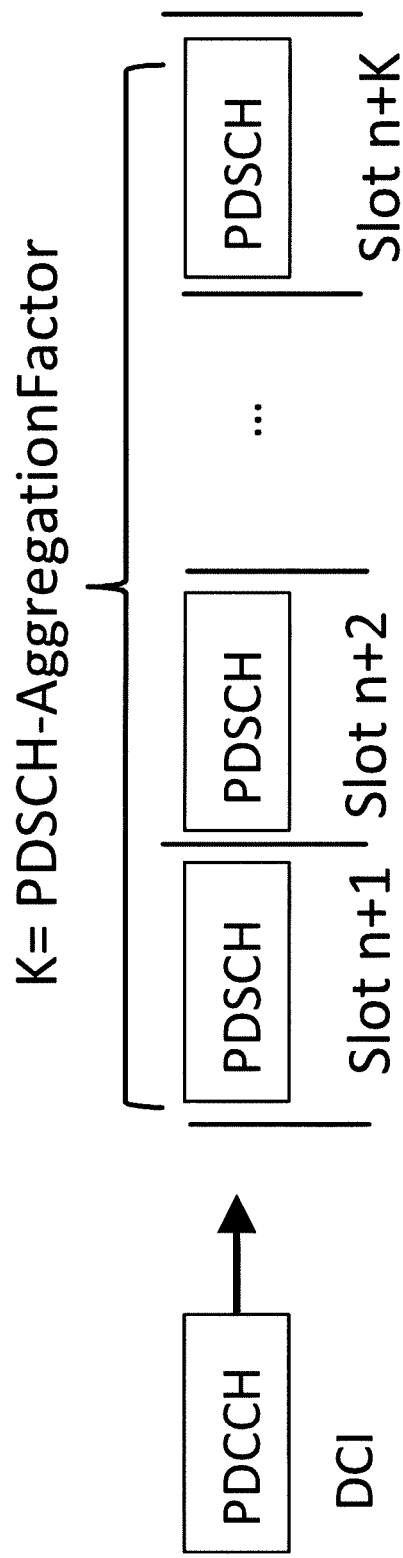
FIG. 5 illustrates multiple PDSCHs for a same TB scheduled by a DCI in NR Rel-15, according to some embodiments.

In these cases, a same TB is repeated within each symbol allocation among each of the pdsch-AggregationFactor consecutive slots and the PDSCH is limited to a single transmission layer. FIG. 5 illustrates multiple PDSCHs for a same TB scheduled by a DCI in NR Rel-15, according to some embodiments.

NR Rel-16 Slot Based PUSCH Repetition

When a UE is configured by the higher layer parameter PDSCH-config that indicates at least one entry in pdsch-TimeDomainAllocationList containing RepNumR16 in PDSCH-TimeDomainResourceAllocation, the UE may be indicated with one or two TCI states in a codepoint of the DCI field 'Transmission Configuration Indication' together with the DCI field "Time domain resource assignment' indicating an entry in pdsch-TimeDomainAllocationList which contains RepNum16 in PDSCH-TimeDomainResourceAllocation and DM-RS port(s) within one CDM group in the DCI field "Antenna Port(s)".

- When two TCI states are indicated in a DCI with 'Transmission Configuration Indication' field, the UE may expect to receive multiple slot level PDSCH transmission occasions of the same TB with two TCI states used across multiple PDSCH transmission occasions as defined in Clause 5.1.2.1.
- When one TCI state is indicated in a DCI with 'Transmission Configuration Indication' field, the UE may expect to receive multiple slot level PDSCH transmission occasions of the same TB with one TCI state used across multiple PDSCH transmission occasions as defined in Clause 5.1.2.1.

Figure 6:
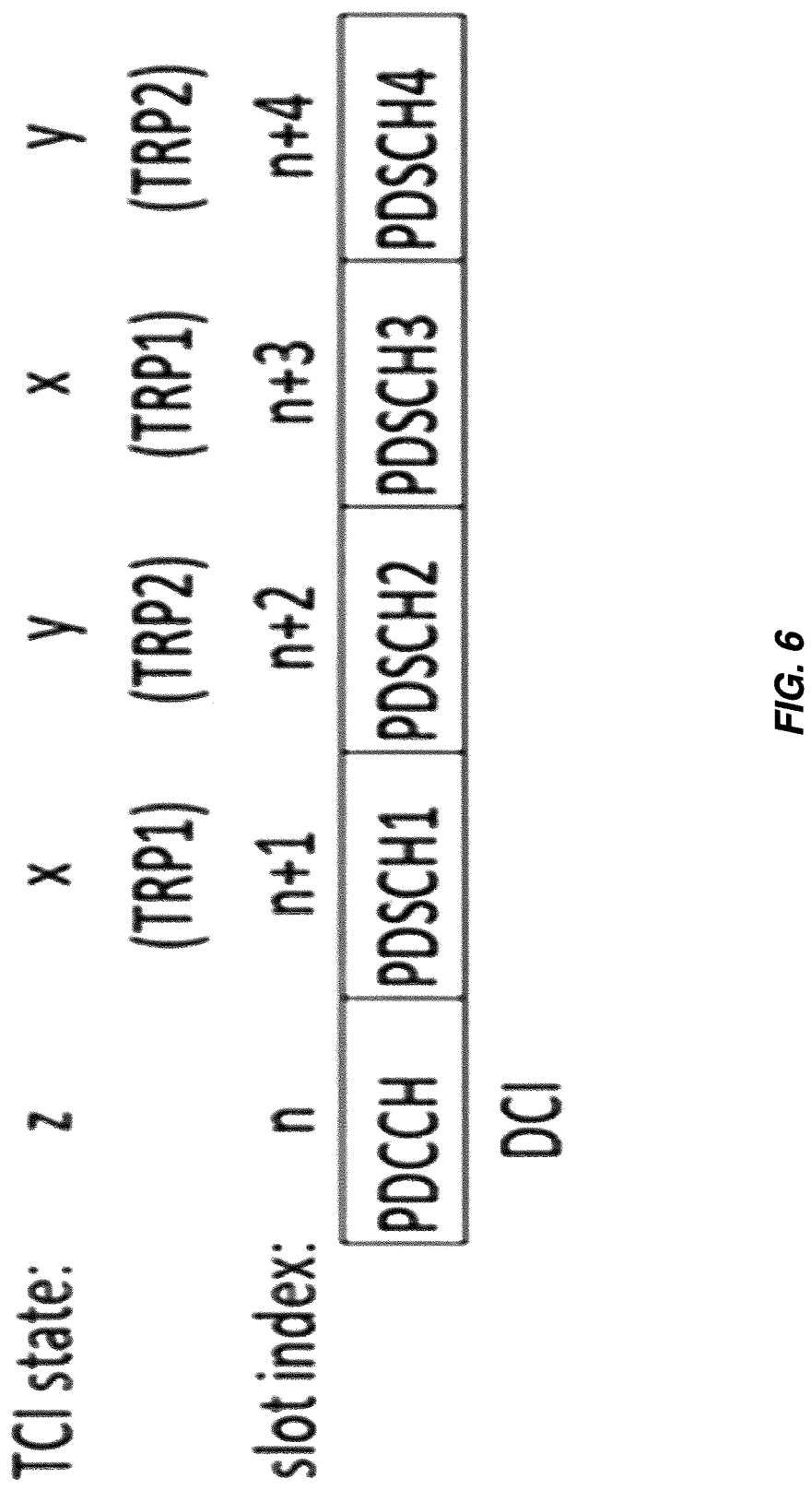
FIG. 6 is an example of NR Rel-16 slot based PUSCH repetition configured with cyclic mapping of TC states by higher layer parameter CycMapping, according to some embodiments of the present disclosure.

FIG. 6 is an example of NR Rel-16 slot based PUSCH repetition configured with cyclic mapping of TCI states by higher layer parameter CycMapping. In this example, the transmissions are scheduled by a single DCI in slot n with 2 TCI states (i.e., TCI states x and y) indicated in the TCI field (i.e., 'Transmission Configuration Indication' field) and RepNumR16=4 indicated in the TDRA field. PDSCHs for a same TB are transmitted over 2 TRPs, TRP1 (with TCI state x) and TRP2 (with TCI state y), and over 4 consecutive slots. The 2 TCI states cycle over the PDSCHs, i.e., PDSCH1 and PDSCH3 in slots n+1 and n+3 respectively are transmitted with TCI state x and PDSCH2 and PDSCH4 in slots n+2 and n+4 respectively are transmitted with TCI state y. The PDCCH is transmitted from a CORESET with TCI state z.

Figure 7:
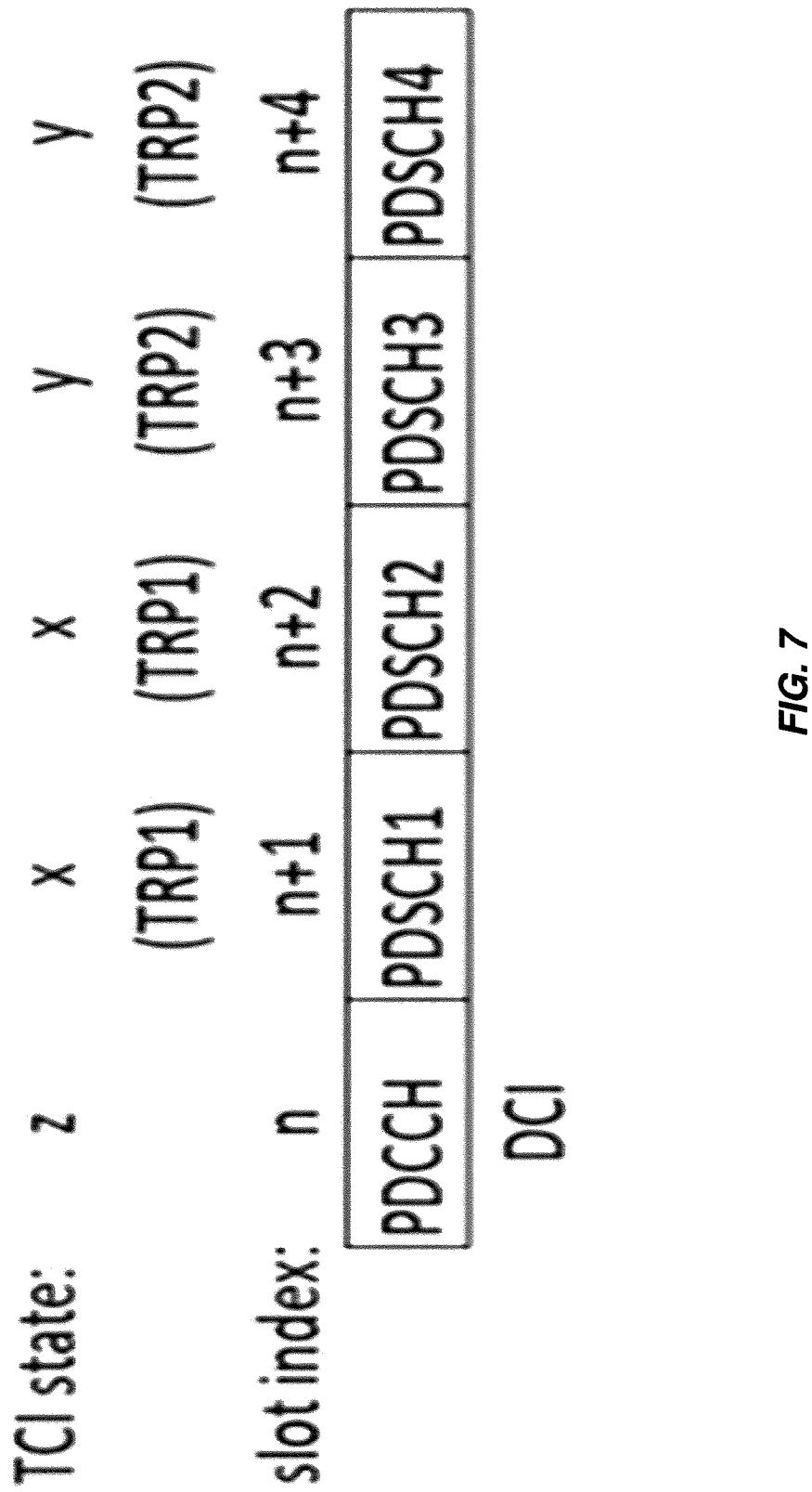
FIG. 7 is an example of NR Rel-16 slot based PUSCH repetition configured with sequential mapping of TC states by higher layer parameter SeqMapping, according to some embodiments of the present disclosure.

FIG. 7 is an example of NR Rel-16 slot based PUSCH repetition configured with sequential mapping of TCI states by higher layer parameter SeqMapping. Again, 2 TCI states (i.e., TCI states x and y) and RepNumR16=4 are indicated in the DCI. In this case, the same TCI state applies over two consecutive slots.

In the above examples, it is assumed that the offset (in OFDM symbols) between the reception of the DL DCI and the corresponding PDSCH is greater than a preconfigured threshold, timeDurationForQCL, so that the TCI states indicated in the TCI field of DCI are applied to the PDSCH transmissions.

NR Re-16 Mini-Slot Based PDSCH Repetition

Figure 8:
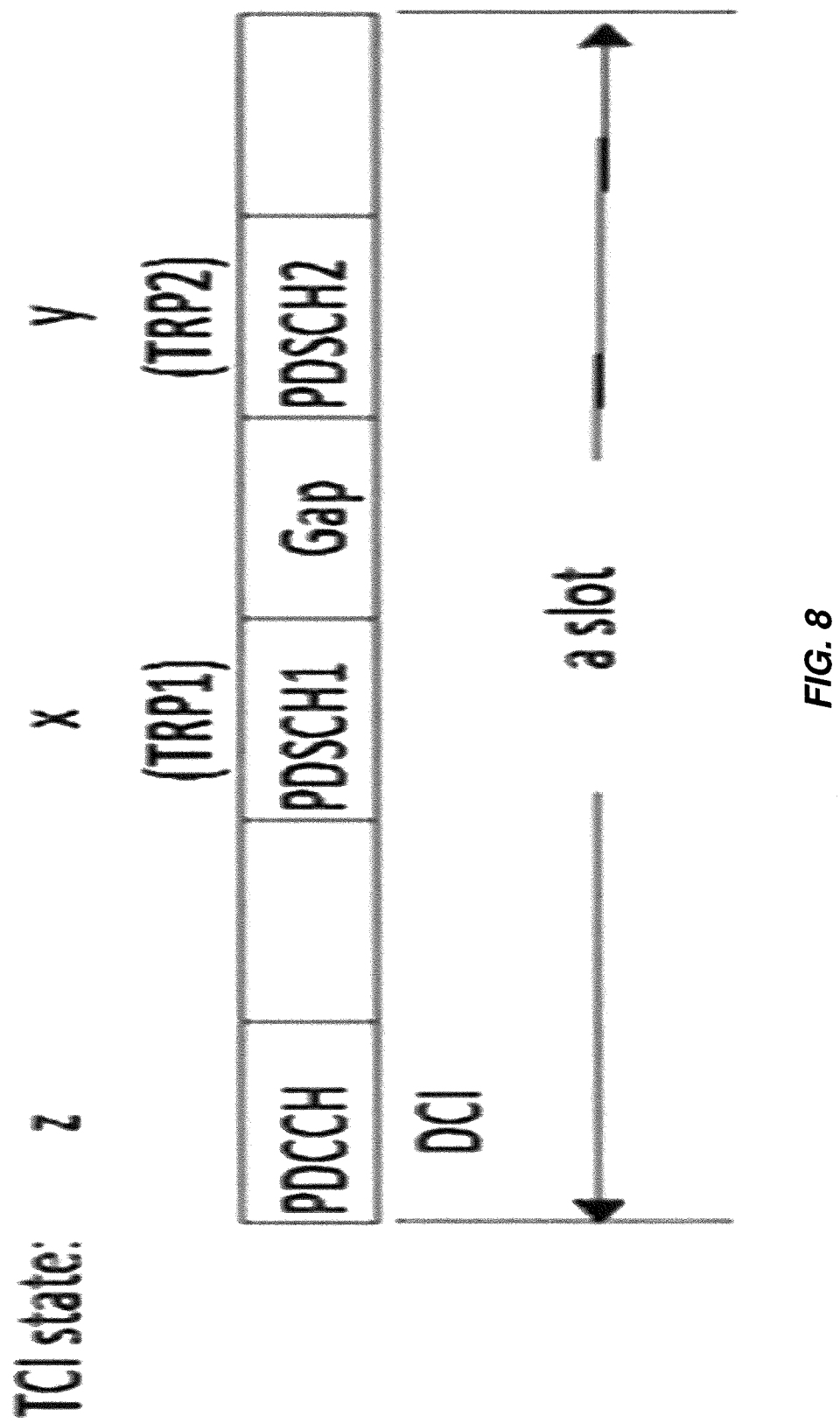
FIG. 8, where two PDSCH transmission occasions (i.e., PDSCH1 and PDSCH2) are scheduled in a same slot by the DCI according to some embodiments of the present disclosure.

When two TCI states are indicated in a DCI and the UE is configured with 'TDMSchemeA', the UE may receive two PDSCH transmission occasions of the same TB with each TCI state associated to a PDSCH transmission occasion which has non-overlapping time domain resource allocation with respect to the other PDSCH transmission occasion and both PDSCH transmission occasions are received within a same slot. An example is shown in FIG. 8, where two PDSCH transmission occasions (i.e., PDSCH1 and PDSCH2) are scheduled in a same slot by the DCI. A gap may be configured between the two PDSCH occasions. Two TCI states (TCI states x and y) are indicated in the DCI. The first TCI state (i.e., TCI state x) is applied to the first PDSCH occasion (i.e., PDSCH1) and the second TCI state (i.e., TCI state y) is applied to the second PDSCH occasion (i.e., PDSCH2).

It is assumed that when the offset (in OFDM symbols) between the reception of the DL DCI and the first PDSCH is greater than a preconfigured threshold timeDurationForQCL, the TCI states indicated in the DCI are applied to the PDSCH transmissions.

Default TCI State(s)
Single TRP Transmission

If no TCI codepoints are mapped to two different TCI states and the time offset between the reception of a DL DCI and the corresponding PDSCH is less than a threshold timeDurationForQCL configured by higher layers, instead of using the TCI state indicated in the TCI field in DCI scheduling a PDSCH, the UE may assume that the TCI state for the PDSCH is given by the TCI state activated for a CORESET with the lowest ControlResourceSetId among one or more CORESETs in the latest slot in an active BWP of a serving cell monitored by the UE. The TCI state is referred here as the default TCI state. If none of configured TCI states for the serving cell of scheduled PDSCH contains 'QCL-TypeD', the UE shall obtain the other QCL assumptions from the TCI states indicated by DCI for its scheduled PDSCH irrespective of the time offset between the reception of the DL DCI and the corresponding PDSCH.

Multi-TRP Transmission

If the offset between the reception of the DL DCI and the corresponding PDSCH is less than the threshold timeDurationForQCL and at least one configured TCI states for the serving cell of scheduled PDSCH contains the 'QCL-TypeD', and at least one TCI codepoint is configured with two TCI states, the UE may assume that the TCI states for the PDSCH are given by the TCI states corresponding to the lowest codepoint among the TCI codepoints containing two different TCI states. In this case, the two TCI states are the default TCI states.

A default TCI state corresponds to a Rx beam used by the UE to receive (and buffer) a PDSCH before the corresponding DCI is decoded (because before DCI decoding, UE doesn't know what TCI state(s) is needed for receive the PDSCH. Otherwise, a wrong Rx beam could be used and the PDSCH could be lost if the time offset between the DCI and the PDSCH, which is unknown before the DCI is decoded, is below the threshold.

There currently exist certain challenge(s). When multiple PDSCH transmission occasions are scheduled and when the time offset between the reception of a DL DCI and corresponding $1^{st}$ PDSCH is less than a threshold timeDurationForQCL, while the time offset between the reception of a DL DCI and the corresponding $2^{nd}$ PDSCH, for example, is greater than the threshold, the UE behavior for the $2^{nd}$ and remaining PDSCH occasions is undefined. This could lead to degraded PDSCH performance if the actual TCI states used for the PDSCH transmission occasions is different from the ones the UE assumed.

Improved systems and methods are needed for determining TCI states.

Systems and methods for determining Transmission Configuration Indication (TCI) states for multiple transmission occasions are provided. In some embodiments, a method performed by a wireless device for determining TCI states for a plurality of transmission occasions includes one or more of: receiving a configuration, where the configuration comprises one or more of: a list of TCI states; a TCI activation command in activating a subset of the TCI states and mapping between each of plurality of codepoints to one or more of the activated TCI states; and a time threshold; receiving in a slot a scheduling message scheduling the plurality of transmission occasions; determining a plurality of time offsets between receiving the scheduling message and each transmission occasion of the plurality of transmission occasions; determining a TCI state for each transmission occasion of the plurality of transmission occasions if at least one time offset of the plurality of time offsets is less than the time threshold; and receiving the plurality of transmission occasions with the determined TCI states. The proposed solutions ensure consistent UE behavior and allow for more robust PDSCH transmission over multiple TRPs.

FIG. 9 illustrates a method performed by a wireless device for determining TCI states for a plurality of transmission occasions. In some embodiments, the wireless device performs one or more of: receiving a configuration, where the configuration comprises one or more of: a list of TCI states; a TCI activation command in activating a subset of the TCI states and mapping between each of plurality of codepoints to one or more of the activated TCI states; and a time threshold (step 900); receiving in a slot a scheduling message scheduling the plurality of transmission occasions (step 902); determining a plurality of time offsets between receiving the scheduling message and each transmission occasion of the plurality of transmission occasions (step 904); determining a TCI state for each transmission occasion of the plurality of transmission occasions if at least one time offset of the plurality of time offsets is less than the time threshold (step 906); and receiving the plurality of transmission occasions with the determined TCI states (step 908). The proposed solutions ensure consistent UE behavior and allow for more robust PDSCH transmission over multiple TRPs.

FIG. 10 illustrates a method performed by a base station for determining TCI states for a plurality of transmission occasions. In some embodiments, the base station performs one or more of: transmitting a configuration to a wireless device, where the configuration comprises one or more of: a list of TCI states; a TCI activation command in activating a subset of the TCI states and mapping between each of plurality of codepoints to one or more of the activated TCI states; and a time threshold (step 1000); transmitting, to the wireless device, in a slot a scheduling message scheduling the plurality of transmission occasions (step 1002); determining a plurality of time offsets between receiving the scheduling message and each transmission occasion of the plurality of transmission occasions (step 1004); determining a TCI state for each transmission occasion of the plurality of transmission occasions if at least one time offset of the plurality of time offsets is less than the time threshold (step 1006); and transmitting, to the wireless device, the plurality of transmission occasions with the determined TCI states (step 1008). The proposed solutions ensure consistent UE behavior and allow for more robust PDSCH transmission over multiple TRPs.

Scenario 1: Single TRP Transmission

In this scenario, no codepoints in the TCI field of DCI are mapped to two different TCI states in the TCI activation MAC CE command. According to NR Rel-15 specification, a single default TCI state is given by the TCI state activated for a CORESET with the lowest ControlResourceSetId among one or more CORESETs in the latest slot in an active BWP of a serving cell monitored by the UE.

When N>1 PDSCH transmission occasions are scheduled by a DCI (e.g., either PDSCH-AggregationFactor=N is configured or RepNumR16=N is configured), if the time offset between the reception of the DCI and the start of the corresponding nth PDSCH is less than a threshold configured by the higher layer parameter timeDurationForQCL, while the time offset between the reception of the DCI and the corresponding start of the $(n+1)^{th}$ PDSCH is greater than the threshold, the default TCI state is applied to PDSCH occasions 1 through to n, while the TCI state indicated in the DCI is applied to the remaining PDSCH occasions (i.e., PDSCH occasions (n+1) through to N).

Figure 11:
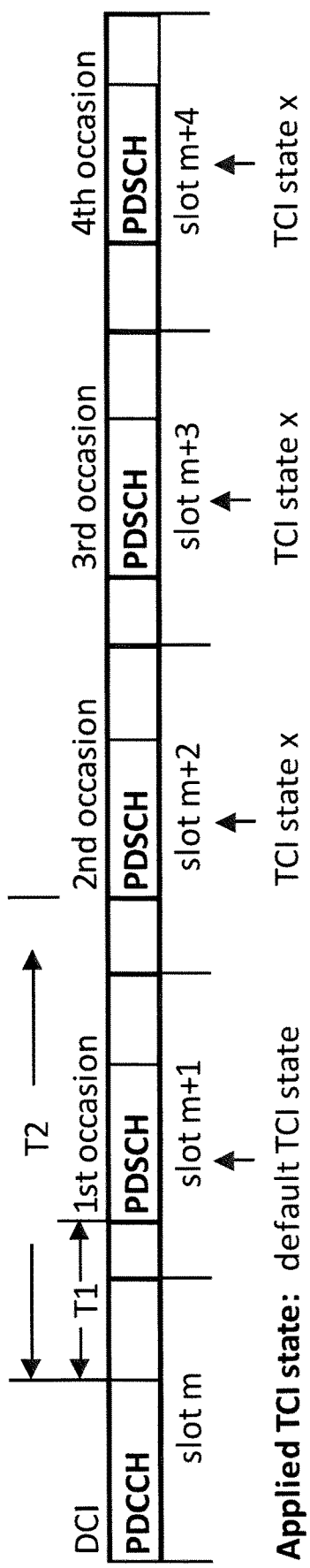
FIG. 11 illustrates an example of TC state allocation for multiple PDSCH transmission occasions (N=4), according to some embodiments.

FIG. 11 illustrates an example of TCI state allocation for multiple PDSCH transmission occasions (N=4), according to some embodiments. An example is shown in FIG. 11, where N=4 and n=1. T1 is the time offset between the reception of the DCI and the $1^{st}$ PDSCH, and T1<timeDurationForQCL. While T2 is the time offset between the reception of the DCI and the $2^{nd}$ PDSCH, and T2>timeDurationForQCL. TCI state x is the TCI state indicated in the TCI field of the DCI. In this case, the default TCI state is applicable for the $1^{st}$ PDSCH occasion while TCI state x is applied for the remaining PDSCH occasions.

Alternatively, if the time offset between the reception of the DCI and the corresponding $1^{st}$ PDSCH is less than the threshold configured by higher layer parameter timeDurationForQCL, the default TCI state is applied to all the PDSCH transmission occasions.

Scenario 2: Multi-TRP Transmission with Slot-Based PDSCH Repetition

In this scenario, if at least one among the configured TCI states for the serving cell of scheduled PDSCH contains the 'QCL-TypeD', and at least one TCI codepoint is mapped to two activated TCI states in the TCI activation MAC CE, the default TCI states for the PDSCH are given by the TCI states corresponding to the lowest codepoint among the TCI codepoints containing two different TCI states, according to NR Rel-16 specification.

When N>1 PDSCH transmission occasions are scheduled by a DCI (e.g., either PDSCH-AggregationFactor=N is configured or RepNumR16=N is configured), if the time offset between the reception of the DCI and the corresponding nth PDSCH is less than a threshold configured by the higher layer parameter timeDurationForQCL, while the time offset between the reception of the DCI and the corresponding $(n+1)^{th}$ PDSCH is greater than the threshold, the default TCI states are applied to the reception of PDSCH occasions 1 through n, while the TCI states (e.g., a first TCI state x and a second TCI state y) indicated in the TCI field of the DCI are applied to the remaining PDSCH occasions (i.e., PDSCH occasions (n+1) through to N).

Figure 12:
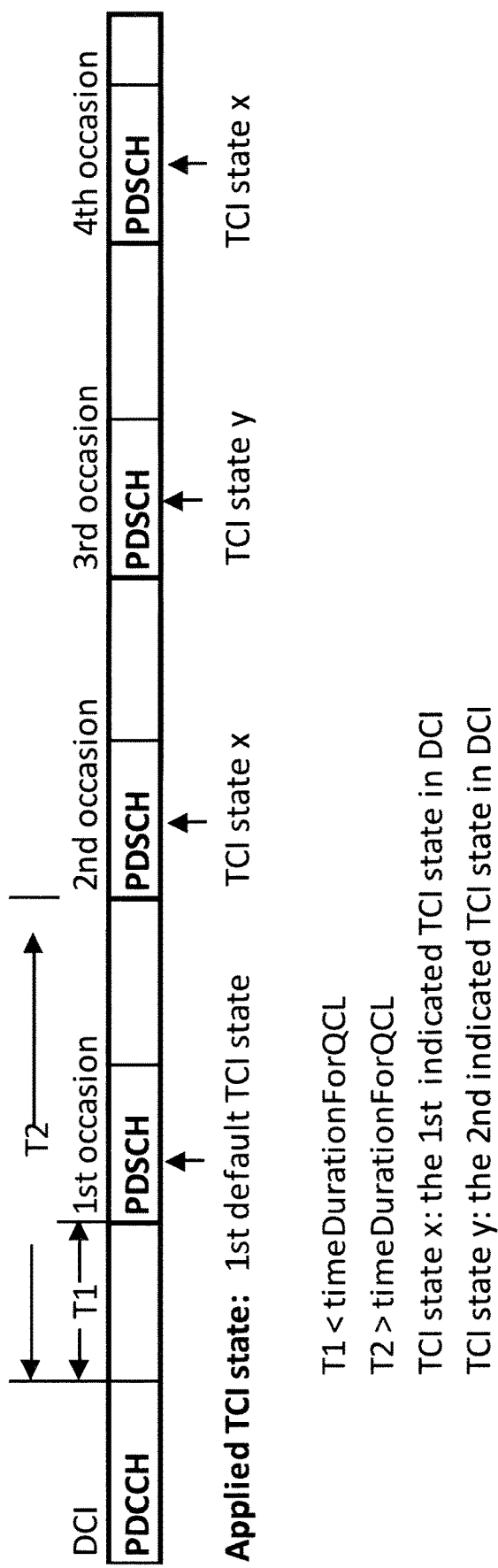
FIG. 12 illustrates an example where the indicated TCI states are applied to the remaining PDSCH occasions starting from the $1^{st}$ TCI state x and then the second TCI state y, according to some embodiments of the present disclosure.

In one embodiment, the indicated TCI states are applied to the remaining PDSCH occasions starting from the $1^{st}$ TCI state x and then the second TCI state y. An example is shown in FIG. 12, where 4 PDSCH transmission occasions are scheduled by a DCI. In this example, the time offset (T1) between the reception of the DCI and the 1st PDSCH is less than the threshold timeDurationForQCL while the time offset (T2) between the reception of the DCI and the 2nd PDSCH is greater than the threshold. In this case, the default TCI state is applied to the $1^{st}$ PDSCH occasion while the TCI states indicated in the DCI are applied to the $2^{nd}$ to the $4^{th}$ PDSCH occasions starting from the first indicated TCI state, TCI state x, in a cyclic manner as configured by a higher layer parameter CycMapping.

Figure 13:
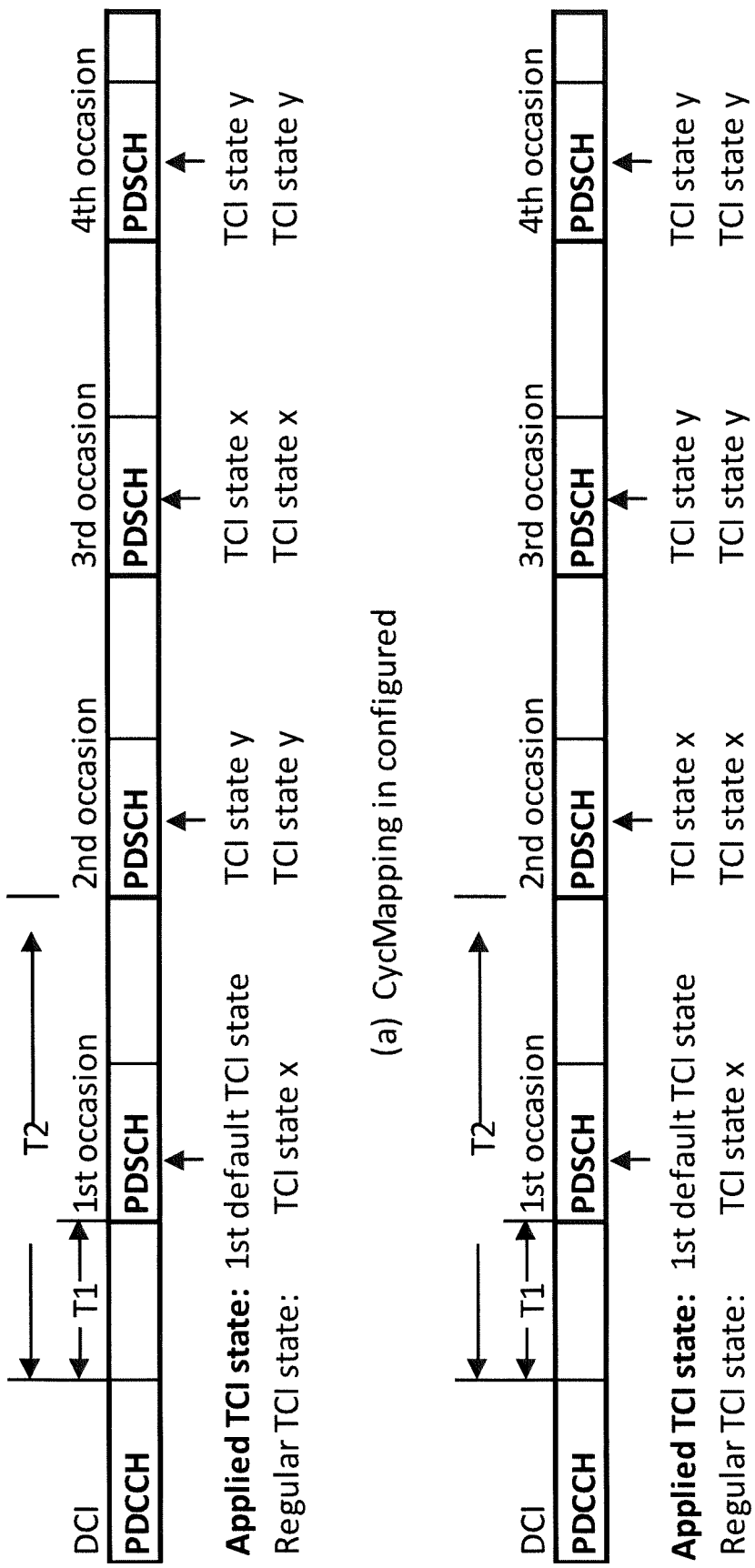
FIG. 13 illustrates an example where the indicated TCI states can be applied to the remaining PDSCH occasions according to the regular TCI state order for those PDSCH occasions when the time offset between the reception of the DCI and the 1st PDSCH is greater than or equal to a threshold configured by timeDurationForQCL, according to some embodiments of the present disclosure.

Alternatively, the indicated TCI states can be applied to the remaining PDSCH occasions according to the regular TCI state order for those PDSCH occasions when the time offset between the reception of the DCI and the 1st PDSCH is greater than or equal to a threshold configured by timeDurationForQCL. An example is shown in FIG. 13, where TCI mapping with CycMapping is shown in FIG. 13(a) and TCI mapping with higher layer parameter SeqMapping is shown FIG. 13(b).

Figure 14:
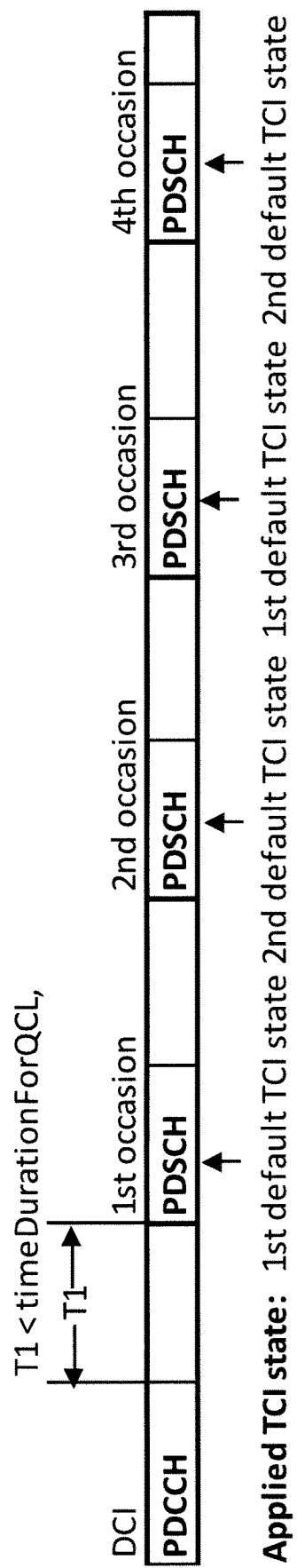
FIG. 14 illustrates an example where, if the time offset between the reception of the DCI and the corresponding $1^{st}$ PDSCH is less than the threshold configured by timeDurationForQCL, the default TCI states are applied to all the PDSCH transmission occasions, according to some embodiments of the present disclosure.
Figure 14:
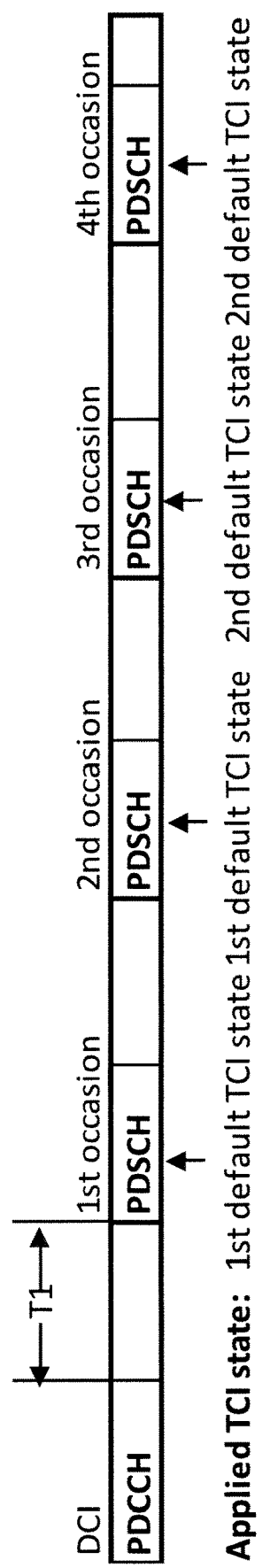

In another embodiment, if the time offset between the reception of the DCI and the corresponding $1^{st}$ PDSCH is less than the threshold configured by timeDurationForQCL, the default TCI states are applied to all the PDSCH transmission occasions. An example is shown FIG. 14 for both CycMapping and SeqMapping.

In another embodiment, it is ensured that the number of different TCI states is limited to two by using the default TCI state in multiple repetitions, even for PDSCH occasions with a time offset larger than timedurationforQCL. Hence, the different multiple PDSCH transmissions use either TCI states {$1^{st}$ default TCI state, TCI state x}, or {$1^{st}$ default TCI state, TCI state y}. For example, if n=1, then the multiple repetitions used are {$1^{st}$ default TCI state, TCI state x, $1^{st}$ default TCI state, TCI state x, $1^{st}$ default TCI state, TCI state x, . . . } or {$1^{st}$ default TCI state, TCI state y, $1^{st}$ default TCI state, TCI state y, . . . } in cyclic mapping or {$1^{st}$ default TCI state, $1^{st}$ default TCI state, TCI state y, TCI state y} in sequential mapping (there are four occasions in this example). Note that the default TCI state may also be used repetitively also for a transmission after the threshold in this sequential case.

This embodiment ensures that the UE does not need to be prepared to receive the PDSCH repetitions using more than two TCI states.

Whether to use {$1^{st}$ default TCI state and TCI state x} or {It default TCI state and TCI state y} can be determined by which is the regular TCI state in the first occasion after the threshold. In sequential mapping, the second TCI state can always be used for the last half of repetitions while the default TCI state is used in the first half (if T1<timedurationforQCL).

Scenario 3: Multi-TRP Transmission with 'TDMSchemeA'

Similar to Scenario 2, in this scenario, at least one among the configured TCI states for the serving cell of scheduled PDSCH contains the 'QCL-TypeD', and at least one TCI codepoint is mapped to two activated TCI states. The default TCI states for the PDSCH are given by the TCI states corresponding to the lowest codepoint among the TCI codepoints containing two different TCI states, according to the NR Rel-16 specification.

Figure 15:
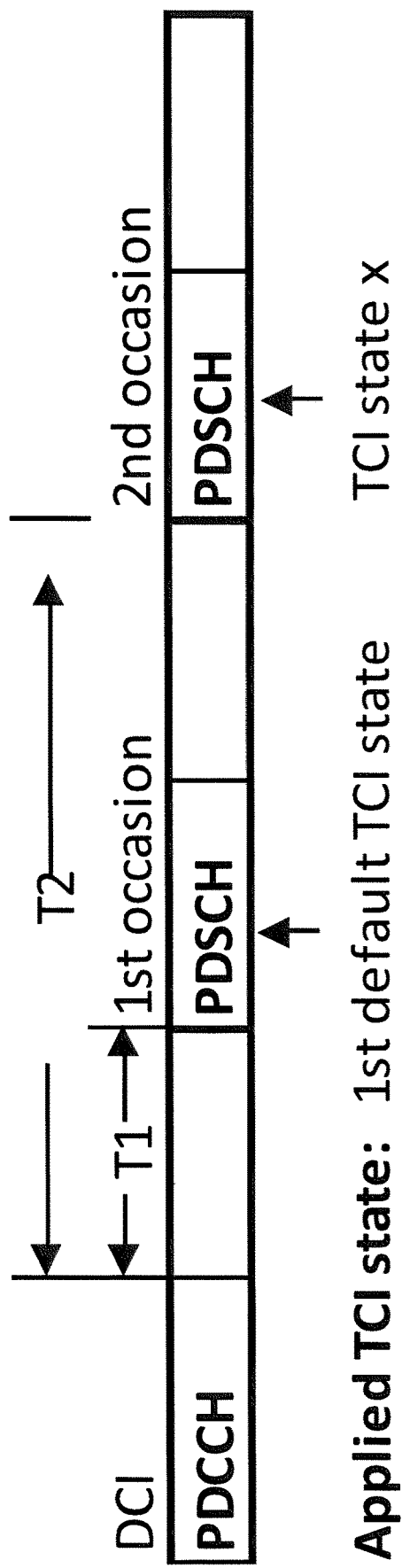
FIG. 15 illustrates a first example embodiment of TC state allocation for 'TDMSchemeA' according to some embodiments of the present disclosure.
Figure 16:
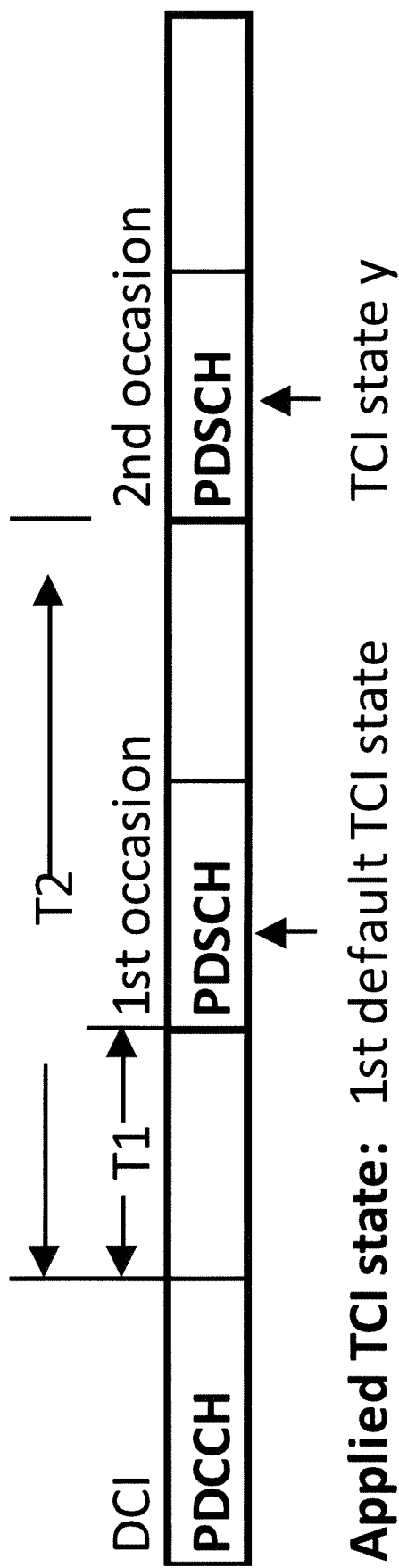
FIG. 16 illustrates a second example embodiment where the $1^{st}$ default TCI state is applied for the $1^{st}$ PDSCH occasion and TCI state y (which is the second indicated TCI state in DCI) is applied for the $2^{nd}$ PDSCH occasion, according to some embodiments of the present disclosure.

A first example embodiment of TCI state allocation for 'TDMSchemeA' is shown in FIG. 15. T1 is the time offset between the reception of the DCI and the $1^{st}$ PDSCH, and T1<timeDurationForQCL. While T2 is the time offset between the reception of the DCI and the $2^{nd}$ PDSCH, and T2>timeDurationForQCL. In this example embodiment, the $1^{st}$ default TCI state is applied for the $1^{st}$ PDSCH occasion and TCI state x (which is the first indicated TCI state in DCI) is applied for the $2^{nd}$ PDSCH occasion. A second example embodiment is shown in FIG. 16. In this second example embodiment, the $1^{st}$ default TCI state is applied for the $1^{st}$ PDSCH occasion and TCI state y (which is the second indicated TCI state in DCI) is applied for the $2^{nd}$ PDSCH occasion.

Figure 17:
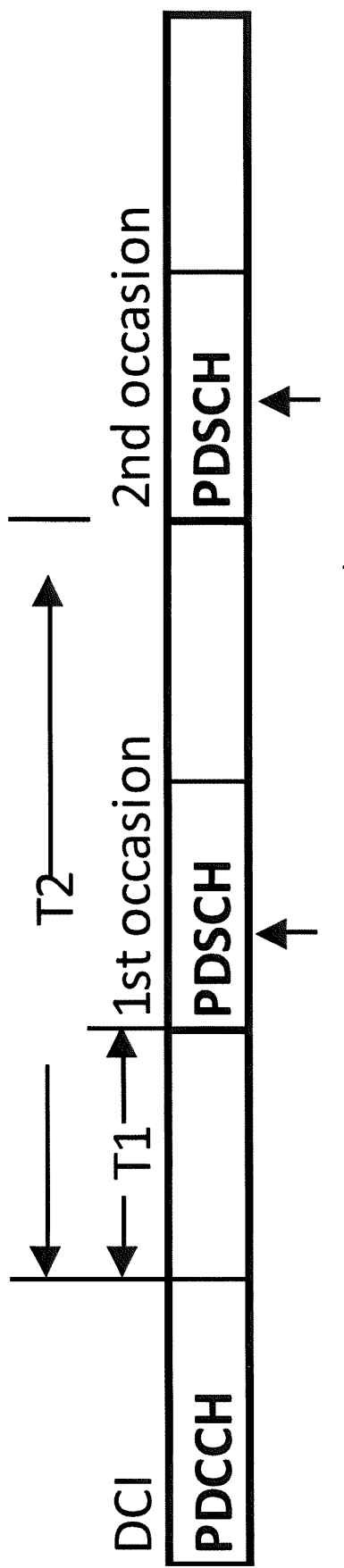
FIG. 17 illustrates a third example embodiment of TC state allocation for 'TDMSchemeA' according to some embodiments of the present disclosure.

A third example embodiment of TCI state allocation for 'TDMSchemeA' is shown in FIG. 17. T1 is the time offset between the reception of the DCI and the $1^{st}$ PDSCH, and T1<timeDurationForQCL. While T2 is the time offset between the reception of the DCI and the $2^{nd}$ PDSCH, and T2<timeDurationForQCL. This example corresponds to the case where the timeDurationForQCL reported by the UE is greater than or equal to 14 symbols (i.e., timeDurationForQCL threshold equal or larger than a slot duration). In this example embodiment, the $1^{st}$ default TCI state is applied for the $1^{st}$ PDSCH occasion and the $2^{nd}$ default TCI state is applied for the $2^{nd}$ PDSCH occasion.

Figure 18:
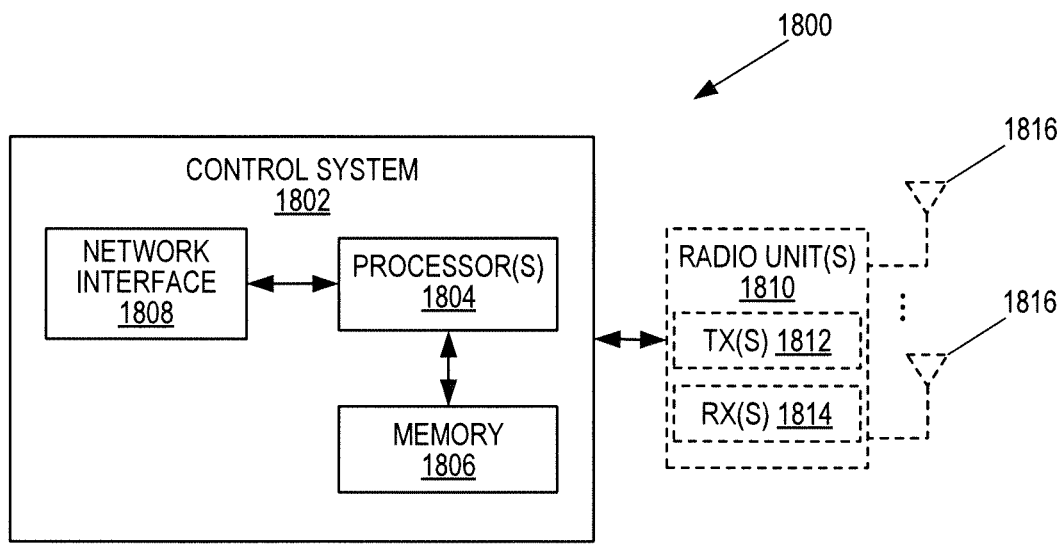
FIG. 18 is a schematic block diagram of a radio access node according to some embodiments of the present disclosure.

FIG. 18 is a schematic block diagram of a radio access node 1800 according to some embodiments of the present disclosure. Optional features are represented by dashed boxes. The radio access node 1800 may be, for example, a base station 402 or 406 or a network node that implements all or part of the functionality of the base station 402 or gNB described herein. As illustrated, the radio access node 1800 includes a control system 1802 that includes one or more processors 1804 (e.g., Central Processing Units (CPUs), Application Specific Integrated Circuits (ASICs), Field Programmable Gate Arrays (FPGAs), and/or the like), memory 1806, and a network interface 1808. The one or more processors 1804 are also referred to herein as processing circuitry. In addition, the radio access node 1800 may include one or more radio units 1810 that each includes one or more transmitters 1812 and one or more receivers 1814 coupled to one or more antennas 1816. The radio units 1810 may be referred to or be part of radio interface circuitry. In some embodiments, the radio unit(s) 1810 is external to the control system 1802 and connected to the control system 1802 via, e.g., a wired connection (e.g., an optical cable). However, in some other embodiments, the radio unit(s) 1810 and potentially the antenna(s) 1816 are integrated together with the control system 1802. The one or more processors 1804 operate to provide one or more functions of a radio access node 1800 as described herein. In some embodiments, the function(s) are implemented in software that is stored, e.g., in the memory 1806 and executed by the one or more processors 1804.

Figure 19:
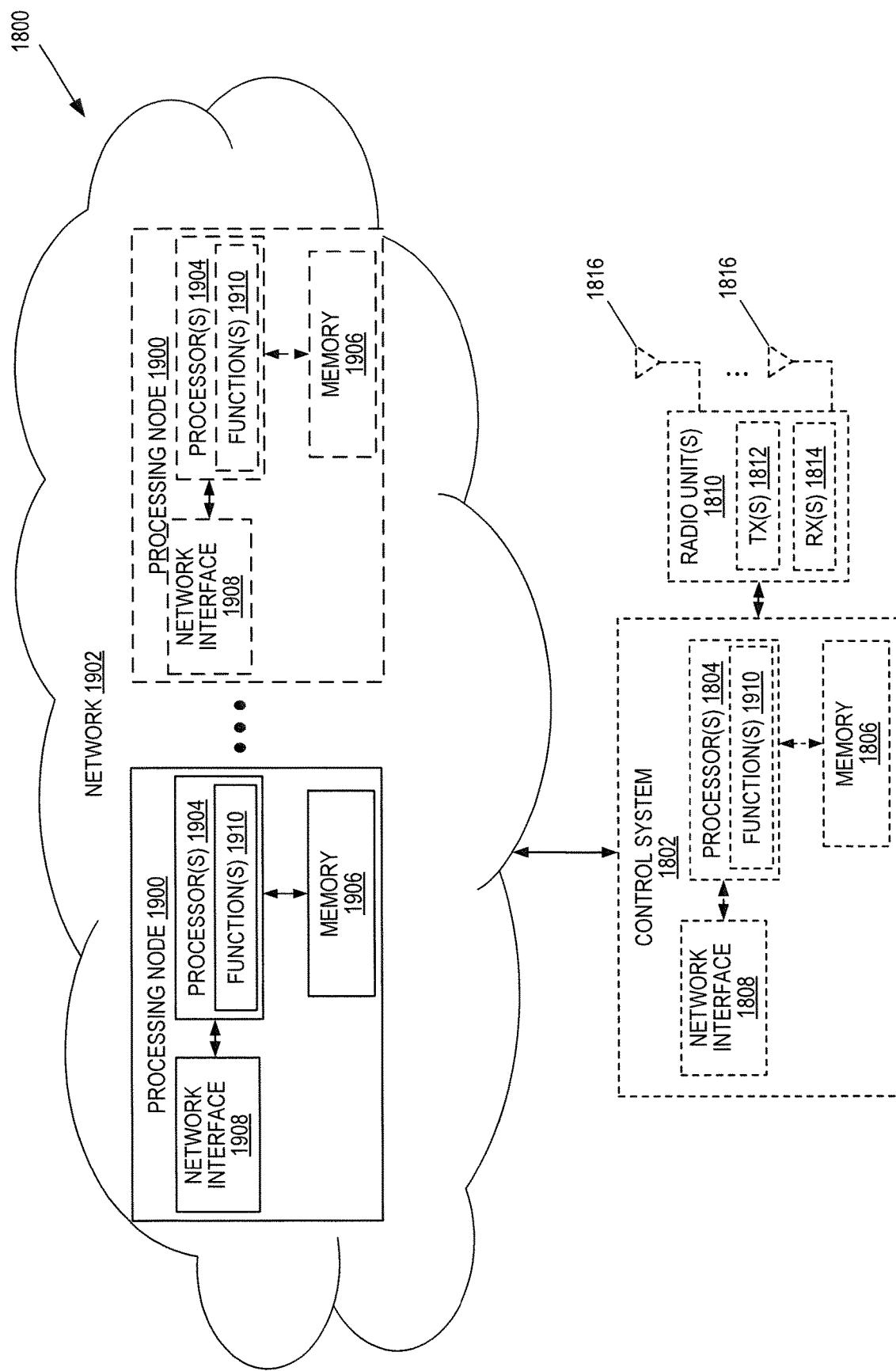
FIG. 19 is a schematic block diagram that illustrates a virtualized embodiment of the radio access node according to some embodiments of the present disclosure.

FIG. 19 is a schematic block diagram that illustrates a virtualized embodiment of the radio access node 1800 according to some embodiments of the present disclosure. This discussion is equally applicable to other types of network nodes. Further, other types of network nodes may have similar virtualized architectures. Again, optional features are represented by dashed boxes.

As used herein, a "virtualized" radio access node is an implementation of the radio access node 1800 in which at least a portion of the functionality of the radio access node 1800 is implemented as a virtual component(s) (e.g., via a virtual machine(s) executing on a physical processing node (s) in a network(s)). As illustrated, in this example, the radio access node 1800 may include the control system 1802 and/or the one or more radio units 1810, as described above. The control system 1802 may be connected to the radio unit(s) 1810 via, for example, an optical cable or the like. The radio access node 1800 includes one or more processing nodes 1900 coupled to or included as part of a network(s) 1902. If present, the control system 1802 or the radio unit(s) are connected to the processing node(s) 1900 via the network 1902. Each processing node 1900 includes one or more processors 1904 (e.g., CPUs, ASICs, FPGAs, and/or the like), memory 1906, and a network interface 1908.

In this example, functions 1910 of the radio access node 1800 described herein are implemented at the one or more processing nodes 1900 or distributed across the one or more processing nodes 1900 and the control system 1802 and/or the radio unit(s) 1810 in any desired manner. In some particular embodiments, some or all of the functions 1910 of the radio access node 1800 described herein are implemented as virtual components executed by one or more virtual machines implemented in a virtual environment(s) hosted by the processing node(s) 1900. As will be appreciated by one of ordinary skill in the art, additional signaling or communication between the processing node(s) 1900 and the control system 1802 is used in order to carry out at least some of the desired functions 1910. Notably, in some embodiments, the control system 1802 may not be included, in which case the radio unit(s) 1810 communicate directly with the processing node(s) 1900 via an appropriate network interface(s).

In some embodiments, a computer program including instructions which, when executed by at least one processor, causes the at least one processor to carry out the functionality of radio access node 1800 or a node (e.g., a processing node 1900) implementing one or more of the functions 1910 of the radio access node 1800 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 20:
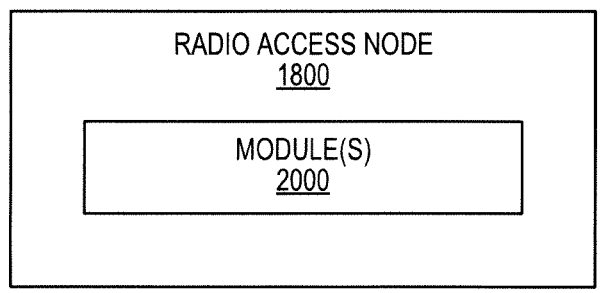
FIG. 20 is a schematic block diagram of the radio access node according to some other embodiments of the present disclosure.

FIG. 20 is a schematic block diagram of the radio access node 1800 according to some other embodiments of the present disclosure. The radio access node 1800 includes one or more modules 2000, each of which is implemented in software. The module(s) 2000 provide the functionality of the radio access node 1800 described herein. This discussion is equally applicable to the processing node 1900 of FIG. 19 where the modules 2000 may be implemented at one of the processing nodes 1900 or distributed across multiple processing nodes 1900 and/or distributed across the processing node(s) 1900 and the control system 1802.

Figure 21:
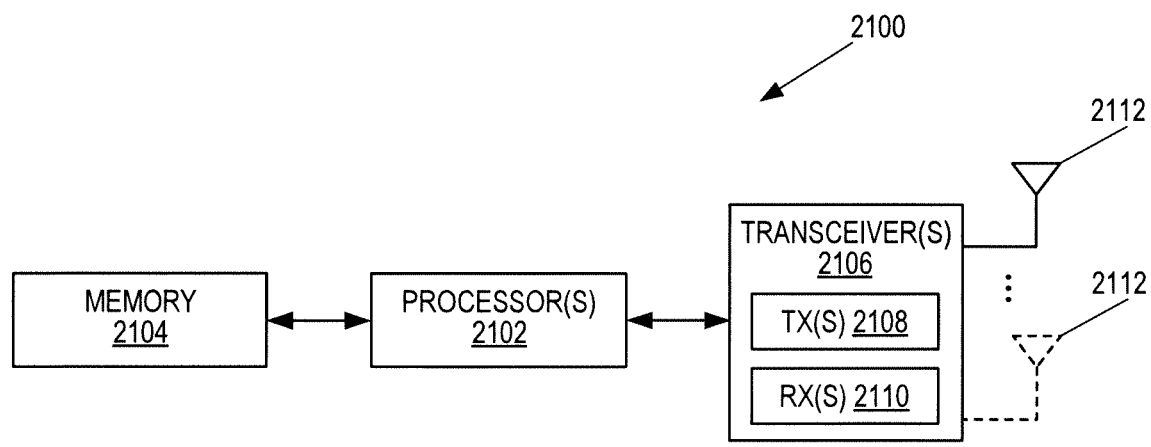
FIG. 21 is a schematic block diagram of a wireless communication device according to some embodiments of the present disclosure.

FIG. 21 is a schematic block diagram of a wireless communication device 2100 according to some embodiments of the present disclosure. As illustrated, the wireless communication device 2100 includes one or more processors 2102 (e.g., CPUs, ASICs, FPGAs, and/or the like), memory 2104, and one or more transceivers 2106 each including one or more transmitters 2108 and one or more receivers 2110 coupled to one or more antennas 2112. The transceiver(s) 2106 includes radio-front end circuitry connected to the antenna(s) 2112 that is configured to condition signals communicated between the antenna(s) 2112 and the processor(s) 2102, as will be appreciated by on of ordinary skill in the art. The processors 2102 are also referred to herein as processing circuitry. The transceivers 2106 are also referred to herein as radio circuitry. In some embodiments, the functionality of the wireless communication device 2100 described above may be fully or partially implemented in software that is, e.g., stored in the memory 2104 and executed by the processor(s) 2102. Note that the wireless communication device 2100 may include additional components not illustrated in FIG. 21 such as, e.g., one or more user interface components (e.g., an input/output interface including a display, buttons, a touch screen, a microphone, a speaker(s), and/or the like and/or any other components for allowing input of information into the wireless communication device 2100 and/or allowing output of information from the wireless communication device 2100), a power supply (e.g., a battery and associated power circuitry), etc.

In some embodiments, a computer program including instructions which, when executed by at least one processor, causes the at least one processor to carry out the functionality of the wireless communication device 2100 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 22:
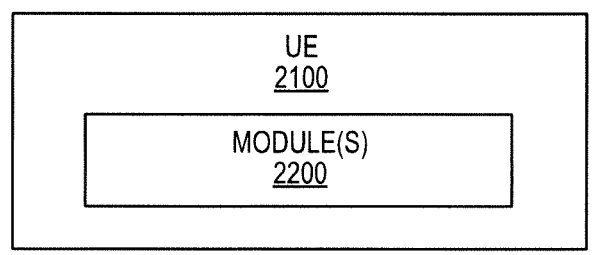
FIG. 22 is a schematic block diagram of the wireless communication device according to some other embodiments of the present disclosure.

FIG. 22 is a schematic block diagram of the wireless communication device 2100 according to some other embodiments of the present disclosure. The wireless communication device 2100 includes one or more modules 2200, each of which is implemented in software. The module(s) 2200 provide the functionality of the wireless communication device 2100 described herein.

Figure 23:
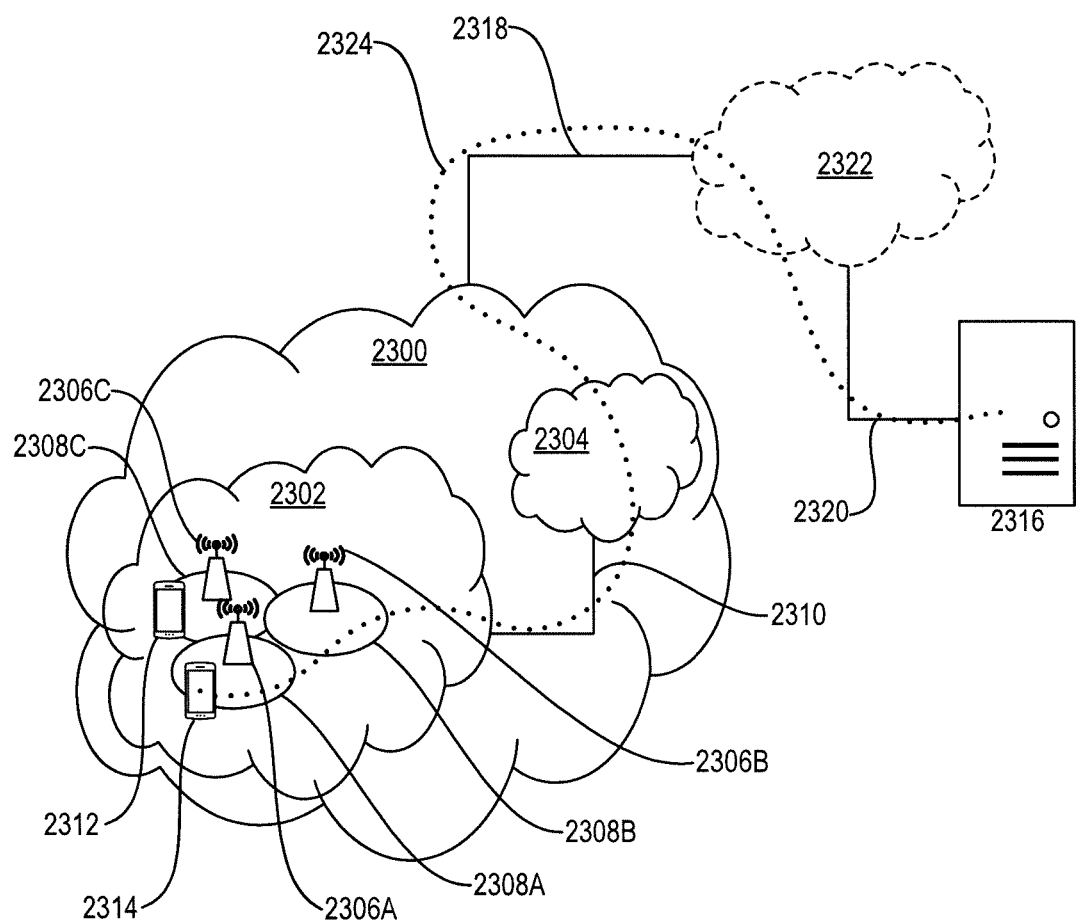
FIG. 23, in accordance with an embodiment, a communication system includes a telecommunication network, such as a 3GPP-type cellular network, which comprises an access network, such as a RAN, and a core network according to some other embodiments of the present disclosure.

With reference to FIG. 23, in accordance with an embodiment, a communication system includes a telecommunication network 2300, such as a 3GPP-type cellular network, which comprises an access network 2302, such as a RAN, and a core network 2304. The access network 2302 comprises a plurality of base stations 2306A, 2306B, 2306C, such as Node Bs, eNBs, gNBs, or other types of wireless Access Points (APs), each defining a corresponding coverage area 2308A, 2308B, 2308C. Each base station 2306A, 2306B, 2306C is connectable to the core network 2304 over a wired or wireless connection 2310. A first UE 2312 located in coverage area 2308C is configured to wirelessly connect to, or be paged by, the corresponding base station 2306C. A second UE 2314 in coverage area 2308A is wirelessly connectable to the corresponding base station 2306A. While a plurality of UEs 2312, 2314 are illustrated in this example, the disclosed embodiments are equally applicable to a situation where a sole UE is in the coverage area or where a sole UE is connecting to the corresponding base station 2306.

The telecommunication network 2300 is itself connected to a host computer 2316, which may be embodied in the hardware and/or software of a standalone server, a cloud-implemented server, a distributed server, or as processing resources in a server farm. The host computer 2316 may be under the ownership or control of a service provider, or may be operated by the service provider or on behalf of the service provider. Connections 2318 and 2320 between the telecommunication network 2300 and the host computer 2316 may extend directly from the core network 2304 to the host computer 2316 or may go via an optional intermediate network 2322. The intermediate network 2322 may be one of, or a combination of more than one of, a public, private, or hosted network; the intermediate network 2322, if any, may be a backbone network or the Internet; in particular, the intermediate network 2322 may comprise two or more sub-networks (not shown).

The communication system of FIG. 23 as a whole enables connectivity between the connected UEs 2312, 2314 and the host computer 2316. The connectivity may be described as an Over-the-Top (OTT) connection 2324. The host computer 2316 and the connected UEs 2312, 2314 are configured to communicate data and/or signaling via the OTT connection 2324, using the access network 2302, the core network 2304, any intermediate network 2322, and possible further infrastructure (not shown) as intermediaries. The OTT connection 2324 may be transparent in the sense that the participating communication devices through which the OTT connection 2324 passes are unaware of routing of uplink and downlink communications. For example, the base station 2306 may not or need not be informed about the past routing of an incoming downlink communication with data originating from the host computer 2316 to be forwarded (e.g., handed over) to a connected UE 2312. Similarly, the base station 2306 need not be aware of the future routing of an outgoing uplink communication originating from the UE 2312 towards the host computer 2316.

Example implementations, in accordance with an embodiment, of the UE, base station, and host computer discussed in the preceding paragraphs will now be described with reference to FIG. 24. In a communication system 2400, a host computer 2402 comprises hardware 2404 including a communication interface 2406 configured to set up and maintain a wired or wireless connection with an interface of a different communication device of the communication system 2400. The host computer 2402 further comprises processing circuitry 2408, which may have storage and/or processing capabilities. In particular, the processing circuitry 2408 may comprise one or more programmable processors, ASICs, FPGAs, or combinations of these (not shown) adapted to execute instructions. The host computer 2402 further comprises software 2410, which is stored in or accessible by the host computer 2402 and executable by the processing circuitry 2408. The software 2410 includes a host application 2412. The host application 2412 may be operable to provide a service to a remote user, such as a UE 2414 connecting via an OTT connection 2416 terminating at the UE 2414 and the host computer 2402. In providing the service to the remote user, the host application 2412 may provide user data which is transmitted using the OTT connection 2416.

The communication system 2400 further includes a base station 2418 provided in a telecommunication system and comprising hardware 2420 enabling it to communicate with the host computer 2402 and with the UE 2414. The hardware 2420 may include a communication interface 2422 for setting up and maintaining a wired or wireless connection with an interface of a different communication device of the communication system 2400, as well as a radio interface 2424 for setting up and maintaining at least a wireless connection 2426 with the UE 2414 located in a coverage area (not shown in FIG. 24) served by the base station 2418. The communication interface 2422 may be configured to facilitate a connection 2428 to the host computer 2402. The connection 2428 may be direct or it may pass through a core network (not shown in FIG. 24) of the telecommunication system and/or through one or more intermediate networks outside the telecommunication system. In the embodiment shown, the hardware 2420 of the base station 2418 further includes processing circuitry 2430, which may comprise one or more programmable processors, ASICs, FPGAs, or combinations of these (not shown) adapted to execute instructions. The base station 2418 further has software 2432 stored internally or accessible via an external connection.

The communication system 2400 further includes the UE 2414 already referred to. The UE's 2414 hardware 2434 may include a radio interface 2436 configured to set up and maintain a wireless connection 2426 with a base station serving a coverage area in which the UE 2414 is currently located. The hardware 2434 of the UE 2414 further includes processing circuitry 2438, which may comprise one or more programmable processors, ASICs, FPGAs, or combinations of these (not shown) adapted to execute instructions. The UE 2414 further comprises software 2440, which is stored in or accessible by the UE 2414 and executable by the processing circuitry 2438. The software 2440 includes a client application 2442. The client application 2442 may be operable to provide a service to a human or non-human user via the UE 2414, with the support of the host computer 2402. In the host computer 2402, the executing host application 2412 may communicate with the executing client application 2442 via the OTT connection 2416 terminating at the UE 2414 and the host computer 2402. In providing the service to the user, the client application 2442 may receive request data from the host application 2412 and provide user data in response to the request data. The OTT connection 2416 may transfer both the request data and the user data. The client application 2442 may interact with the user to generate the user data that it provides.

Figure 24:
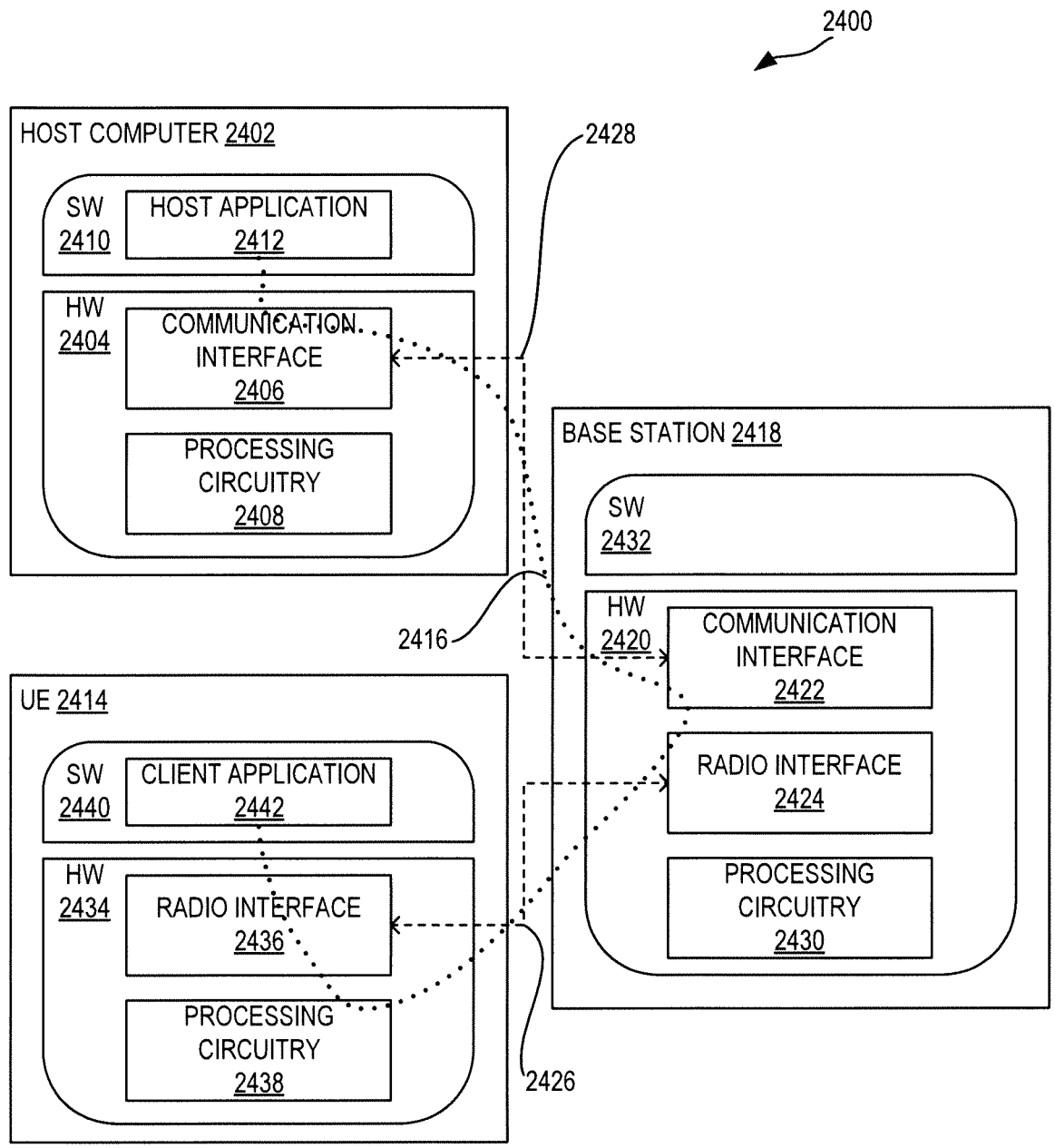
FIG. 24 illustrates an example implementation, in accordance with an embodiment, of the UE, base station, and host computer according to some other embodiments of the present disclosure.

It is noted that the host computer 2402, the base station 2418, and the UE 2414 illustrated in FIG. 24 may be similar or identical to the host computer 2316, one of the base stations 2306A, 2306B, 2306C, and one of the UEs 2312, 2314 of FIG. 23, respectively. This is to say, the inner workings of these entities may be as shown in FIG. 24 and independently, the surrounding network topology may be that of FIG. 23.

In FIG. 24, the OTT connection 2416 has been drawn abstractly to illustrate the communication between the host computer 2402 and the UE 2414 via the base station 2418 without explicit reference to any intermediary devices and the precise routing of messages via these devices. The network infrastructure may determine the routing, which may be configured to hide from the UE 2414 or from the service provider operating the host computer 2402, or both. While the OTT connection 2416 is active, the network infrastructure may further take decisions by which it dynamically changes the routing (e.g., on the basis of load balancing consideration or reconfiguration of the network).

The wireless connection 2426 between the UE 2414 and the base station 2418 is in accordance with the teachings of the embodiments described throughout this disclosure. One or more of the various embodiments improve the performance of OTT services provided to the UE 2414 using the OTT connection 2416, in which the wireless connection 2426 forms the last segment. More precisely, the teachings of these embodiments may improve the e.g., data rate, latency, power consumption, etc. and thereby provide benefits such as e.g., reduced user waiting time, relaxed restriction on file size, better responsiveness, extended battery lifetime, etc.

A measurement procedure may be provided for the purpose of monitoring data rate, latency, and other factors on which the one or more embodiments improve. There may further be an optional network functionality for reconfiguring the OTT connection 2416 between the host computer 2402 and the UE 2414, in response to variations in the measurement results. The measurement procedure and/or the network functionality for reconfiguring the OTT connection 2416 may be implemented in the software 2410 and the hardware 2404 of the host computer 2402 or in the software 2440 and the hardware 2434 of the UE 2414, or both. In some embodiments, sensors (not shown) may be deployed in or in association with communication devices through which the OTT connection 2416 passes; the sensors may participate in the measurement procedure by supplying values of the monitored quantities exemplified above, or supplying values of other physical quantities from which the software 2410, 2440 may compute or estimate the monitored quantities. The reconfiguring of the OTT connection 2416 may include message format, retransmission settings, preferred routing, etc.; the reconfiguring need not affect the base station 2418, and it may be unknown or imperceptible to the base station 2418. Such procedures and functionalities may be known and practiced in the art. In certain embodiments, measurements may involve proprietary UE signaling facilitating the host computer 2402's measurements of throughput, propagation times, latency, and the like. The measurements may be implemented in that the software 2410 and 2440 causes messages to be transmitted, in particular empty or 'dummy' messages, using the OTT connection 2416 while it monitors propagation times, errors, etc.

Figures 25, 26:
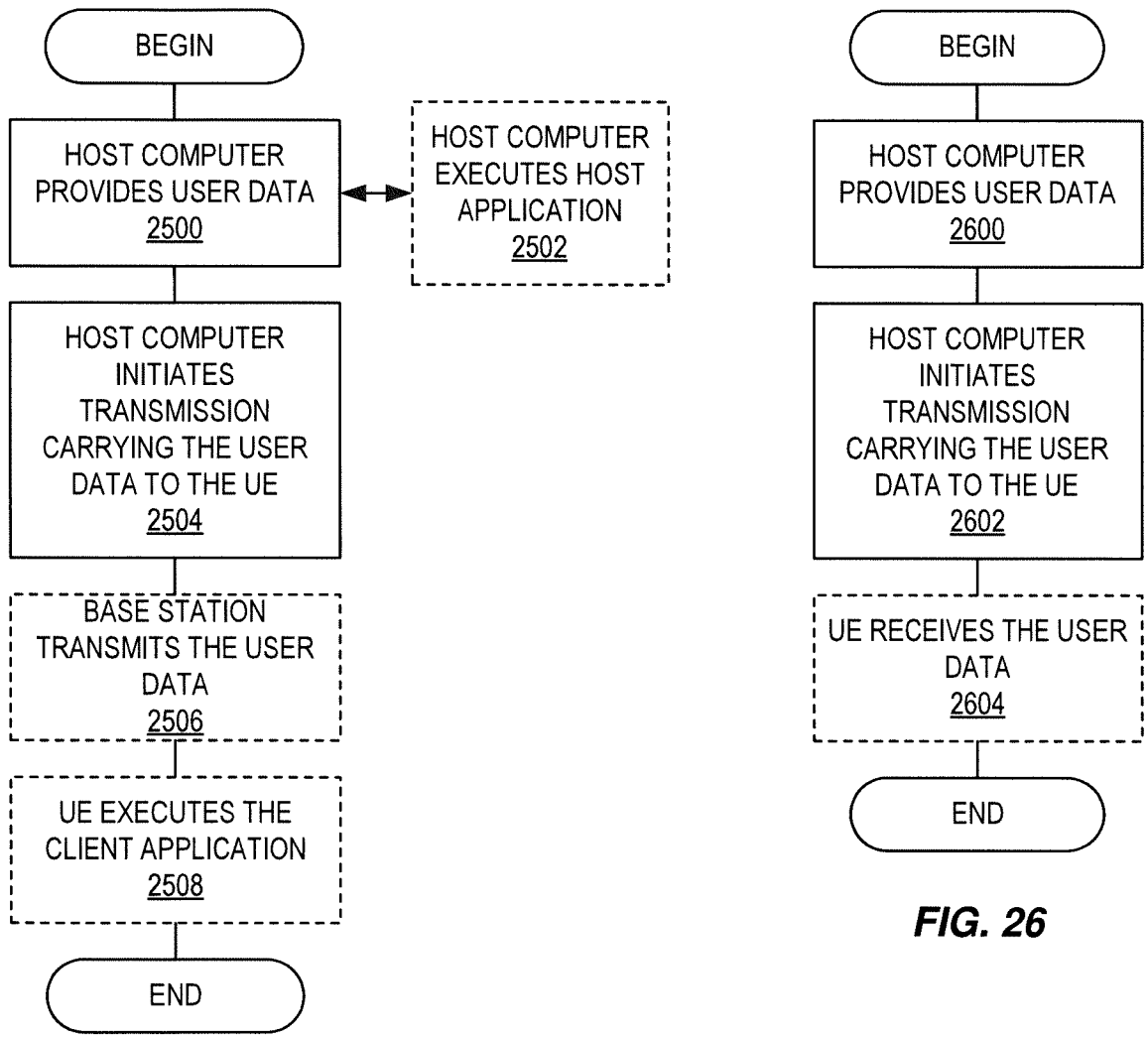
FIG. 25 is a flowchart illustrating a method implemented in a communication system, in accordance with one embodiment.
FIG. 26 is a flowchart illustrating a method implemented in a communication system, in accordance with one embodiment.

FIG. 25 is a flowchart illustrating a method implemented in a communication system, in accordance with one embodiment. The communication system includes a host computer, a base station, and a UE which may be those described with reference to FIGS. 23 and 24. For simplicity of the present disclosure, only drawing references to FIG. 25 will be included in this section. In step 2500, the host computer provides user data. In sub-step 2502 (which may be optional) of step 2500, the host computer provides the user data by executing a host application. In step 2504, the host computer initiates a transmission carrying the user data to the UE. In step 2506 (which may be optional), the base station transmits to the UE the user data which was carried in the transmission that the host computer initiated, in accordance with the teachings of the embodiments described throughout this disclosure. In step 2508 (which may also be optional), the UE executes a client application associated with the host application executed by the host computer.

FIG. 26 is a flowchart illustrating a method implemented in a communication system, in accordance with one embodiment. The communication system includes a host computer, a base station, and a UE which may be those described with reference to FIGS. 23 and 24. For simplicity of the present disclosure, only drawing references to FIG. 26 will be included in this section. In step 2600 of the method, the host computer provides user data. In an optional sub-step (not shown) the host computer provides the user data by executing a host application. In step 2602, the host computer initiates a transmission carrying the user data to the UE. The transmission may pass via the base station, in accordance with the teachings of the embodiments described throughout this disclosure. In step 2604 (which may be optional), the UE receives the user data carried in the transmission.

FIG. 27 is a flowchart illustrating a method implemented in a communication system, in accordance with one embodiment. The communication system includes a host computer, a base station, and a UE which may be those described with reference to FIGS. 23 and 24. For simplicity of the present disclosure, only drawing references to FIG. 27 will be included in this section. In step 2700 (which may be optional), the UE receives input data provided by the host computer. Additionally or alternatively, in step 2702, the UE provides user data. In sub-step 2704 (which may be optional) of step 2700, the UE provides the user data by executing a client application. In sub-step 2706 (which may be optional) of step 2702, the UE executes a client application which provides the user data in reaction to the received input data provided by the host computer. In providing the user data, the executed client application may further consider user input received from the user. Regardless of the specific manner in which the user data was provided, the UE initiates, in sub-step 2708 (which may be optional), transmission of the user data to the host computer. In step 2710 of the method, the host computer receives the user data transmitted from the UE, in accordance with the teachings of the embodiments described throughout this disclosure.

FIG. 28 is a flowchart illustrating a method implemented in a communication system, in accordance with one embodiment. The communication system includes a host computer, a base station, and a UE which may be those described with reference to FIGS. 23 and 24. For simplicity of the present disclosure, only drawing references to FIG. 28 will be included in this section. In step 2800 (which may be optional), in accordance with the teachings of the embodiments described throughout this disclosure, the base station receives user data from the UE. In step 2802 (which may be optional), the base station initiates transmission of the received user data to the host computer. In step 2804 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

EMBODIMENTS

Group A Embodiments

Embodiment 1: A method performed by a wireless device for determining Transmission Configuration Indication, TCI, states for a plurality of transmission occasions, the method comprising one or more of: receiving (900) a configuration, where the configuration comprises one or more of: a list of TCI states; a TCI activation command in activating a subset of the TCI states and mapping between each of plurality of codepoints to one or more of the activated TCI states; and a time threshold; receiving (902) in a slot a scheduling message scheduling the plurality of transmission occasions; determining (904) a plurality of time offsets between receiving the scheduling message and each transmission occasion of the plurality of transmission occasions; determining (906) a TCI state for each transmission occasion of the plurality of transmission occasions if at least one time offset of the plurality of time offsets is less than the time threshold; and receiving (908) the plurality of transmission occasions with the determined TCI states.

Embodiment 2: The method of embodiment 1 wherein the scheduling message scheduling the plurality of transmission occasions comprises a Downlink Control Information, DCI, scheduling the plurality of transmission occasions.

Embodiment 3: The method of any of embodiments 1 to 2 wherein the multiple transmission occasions comprise multiple Physical Downlink Shared Channel, PDSCH, transmission occasions.

Embodiment 4: The method of any of the previous embodiments further comprising: determining a first time offset and a second time offset, wherein the first time offset is below the time threshold and the second time offset is equal or greater than the time threshold.

Embodiment 5: The method of any of the previous embodiments further comprising: determining one or two default TCI state based on the codepoint to TCI state(s) mapping in the activation command.

Embodiment 6: The method of any of the previous embodiments wherein the DCI indicates one or more TCI state for the PDSCH transmission occasions.

Embodiment 7: The method of any of the previous embodiments wherein one or more default TCI state is applied to PDSCH occasions associated to the first time offset and the one or more indicated TCI state is applied to PDSCH occasions associated to the second time offset.

Embodiment 8: The method of any of the previous embodiments wherein if two default TCI states, a first and a second default TCI state, are determined, the first default TCI state and the second TCI state are applied to the PDSCH occasions associated to the first time offset exists alternately every one or two PDSCH occasions.

Embodiment 9: The method of any of the previous embodiments wherein if two TCI states, a first and a second indicated TCI state, are indicated in the DCI, the first indicated TCI state and the second indicated TCI states are applied to PDSCH occasions associated to the second time offset alternately every one or two PDSCH occasions starting from the first indicated TCI state.

Embodiment 10: The method of any of the previous embodiments wherein if two TCI states, a first and a second indicated TCI state, are indicated in the DCI, the first indicated TCI state and the second indicated TCI states are applied to PDSCH occasions associated to the second time offset in a same order as if the first time offset does not exist.

Embodiment 11: The method of any of the previous embodiments wherein one or more default TCI state is applied to all PDSCH occasions if the first time offset exists.

Embodiment 12: The method of any of the previous embodiments wherein if two default TCI states, a first and a second default TCI state, are determined, the first default TCI state and the second TCI state are applied to the PDSCH occasions alternately every one or two PDSCH occasions.

Embodiment 13: The method of any of the previous embodiments, further comprising: providing user data; and forwarding the user data to a host computer via the transmission to the base station.

Group B Embodiments

Embodiment 14: A method performed by a base station for determining Transmission Configuration Indication, TCI, states for a plurality of transmission occasions, the method comprising: transmitting (1000) a configuration to a wireless device, where the configuration comprises one or more of: a list of TCI states; a TCI activation command in activating a subset of the TCI states and mapping between each of plurality of codepoints to one or more of the activated TCI states; and a time threshold; transmitting (1002), to the wireless device, in a slot a scheduling message scheduling the plurality of transmission occasions; determining (1004) a plurality of time offsets between receiving the scheduling message and each transmission occasion of the plurality of transmission occasions; determining (1006) a TCI state for each transmission occasion of the plurality of transmission occasions if at least one time offset of the plurality of time offsets is less than the time threshold; and transmitting (1008), to the wireless device, the plurality of transmission occasions with the determined TCI states.

Embodiment 15: The method of embodiment 14 wherein the scheduling message scheduling the plurality of transmission occasions comprises a Downlink Control Information, DCI, scheduling the plurality of transmission occasions.

Embodiment 16: The method of any of embodiments 14 to 15 wherein the multiple transmission occasions comprise multiple Physical Downlink Shared Channel, PDSCH, transmission occasions.

Embodiment 17: The method of any of the previous embodiments further comprising: determining a first time offset and a second time offset, wherein the first time offset is below the time threshold and the second time offset is equal or greater than the time threshold.

Embodiment 18: The method of any of the previous embodiments further comprising: determining one or two default TCI state based on the codepoint to TCI state(s) mapping in the activation command.

Embodiment 19: The method of any of the previous embodiments wherein the DCI indicates one or more TCI state for the PDSCH transmission occasions.

Embodiment 20: The method of any of the previous embodiments wherein one or more default TCI state is applied to PDSCH occasions associated to the first time offset and the one or more indicated TCI state is applied to PDSCH occasions associated to the second time offset.

Embodiment 21: The method of any of the previous embodiments wherein if two default TCI states, a first and a second default TCI state, are determined, the first default TCI state and the second TCI state are applied to the PDSCH occasions associated to the first time offset exists alternately every one or two PDSCH occasions.

Embodiment 22: The method of any of the previous embodiments wherein if two TCI states, a first and a second indicated TCI state, are indicated in the DCI, the first indicated TCI state and the second indicated TCI states are applied to PDSCH occasions associated to the second time offset alternately every one or two PDSCH occasions starting from the first indicated TCI state.

Embodiment 23: The method of any of the previous embodiments wherein if two TCI states, a first and a second indicated TCI state, are indicated in the DCI, the first indicated TCI state and the second indicated TCI states are applied to PDSCH occasions associated to the second time offset in a same order as if the first time offset does not exist.

Embodiment 24: The method of any of the previous embodiments wherein one or more default TCI state is applied to all PDSCH occasions if the first time offset exists.

Embodiment 25: The method of any of the previous embodiments wherein if two default TCI states, a first and a second default TCI state, are determined, the first default TCI state and the second TCI state are applied to the PDSCH occasions alternately every one or two PDSCH occasions.

Embodiment 26: The method of any of the previous embodiments, further comprising: obtaining user data; and forwarding the user data to a host computer or a wireless device.

Group C Embodiments

Embodiment 27: A wireless device for determining Transmission Configuration Indication, TCI, states for a plurality of transmission occasions, the wireless device comprising: processing circuitry configured to perform any of the steps of any of the Group A embodiments; and power supply circuitry configured to supply power to the wireless device.

Embodiment 28: A base station for determining Transmission Configuration Indication, TCI, states for a plurality of transmission occasions, the base station comprising: processing circuitry configured to perform any of the steps of any of the Group B embodiments; and power supply circuitry configured to supply power to the base station.

Embodiment 29: A User Equipment, UE, for determining Transmission Configuration Indication, TCI, states for a plurality of transmission occasions, the UE comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Embodiment 30: A communication system including a host computer comprising: processing circuitry configured to provide user data; and a communication interface configured to forward the user data to a cellular network for transmission to a User Equipment, UE; wherein the cellular network comprises a base station having a radio interface and processing circuitry, the base station's processing circuitry configured to perform any of the steps of any of the Group B embodiments.

Embodiment 31: The communication system of the previous embodiment further including the base station.

Embodiment 32: The communication system of the previous 2 embodiments, further including the UE, wherein the UE is configured to communicate with the base station.

Embodiment 33: The communication system of the previous 3 embodiments, wherein: the processing circuitry of the host computer is configured to execute a host application, thereby providing the user data; and the UE comprises processing circuitry configured to execute a client application associated with the host application.

Embodiment 34: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the base station performs any of the steps of any of the Group B embodiments.

Embodiment 35: The method of the previous embodiment, further comprising, at the base station, transmitting the user data.

Embodiment 36: The method of the previous 2 embodiments, wherein the user data is provided at the host computer by executing a host application, the method further comprising, at the UE, executing a client application associated with the host application.

Embodiment 37: A User Equipment, UE, configured to communicate with a base station, the UE comprising a radio interface and processing circuitry configured to perform the method of the previous 3 embodiments.

Embodiment 38: A communication system including a host computer comprising: processing circuitry configured to provide user data; and a communication interface configured to forward user data to a cellular network for transmission to a User Equipment, UE; wherein the UE comprises a radio interface and processing circuitry, the UE's components configured to perform any of the steps of any of the Group A embodiments.

Embodiment 39: The communication system of the previous embodiment, wherein the cellular network further includes a base station configured to communicate with the UE.

Embodiment 40: The communication system of the previous 2 embodiments, wherein: the processing circuitry of the host computer is configured to execute a host application, thereby providing the user data; and the UE's processing circuitry is configured to execute a client application associated with the host application.

Embodiment 41: A method implemented in a communication system including a host computer, a base station, and a User Equipment, UE, the method comprising: at the host computer, providing user data; and at the host computer, initiating a transmission carrying the user data to the UE via a cellular network comprising the base station, wherein the UE performs any of the steps of any of the Group A embodiments.

Embodiment 42: The method of the previous embodiment, further comprising at the UE, receiving the user data from the base station.

Embodiment 43: A communication system including a host computer comprising: communication interface configured to receive user data originating from a transmission from a User Equipment, UE, to a base station; wherein the UE comprises a radio interface and processing circuitry, the UE's processing circuitry configured to perform any of the steps of any of the Group A embodiments.

Embodiment 44: The communication system of the previous embodiment, further including the UE.

Embodiment 45: The communication system of the previous 2 embodiments, further including the base station, wherein the base station comprises a radio interface configured to communicate with the UE and a communication interface configured to forward to the host computer the user data carried by a transmission from the UE to the base station.

Embodiment 46: The communication system of the previous 3 embodiments, wherein: the processing circuitry of the host computer is configured to execute a host application; and the UE's processing circuitry is configured to execute a client application associated with the host application, thereby providing the user data.

Embodiment 47: The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

Embodiment 48: A method implemented in a communication system including a host computer, a base station, and a User Equipment, UE, the method comprising: at the host computer, receiving user data transmitted to the base station from the UE, wherein the UE performs any of the steps of any of the Group A embodiments.

Embodiment 49: The method of the previous embodiment, further comprising, at the UE, providing the user data to the base station.

Embodiment 50: The method of the previous 2 embodiments, further comprising: at the UE, executing a client application, thereby providing the user data to be transmitted; and at the host computer, executing a host application associated with the client application.

Embodiment 51: The method of the previous 3 embodiments, further comprising: at the UE, executing a client application; and at the UE, receiving input data to the client application, the input data being provided at the host computer by executing a host application associated with the client application; wherein the user data to be transmitted is provided by the client application in response to the input data.

Embodiment 52: A communication system including a host computer comprising a communication interface configured to receive user data originating from a transmission from a User Equipment, UE, to a base station, wherein the base station comprises a radio interface and processing circuitry, the base station's processing circuitry configured to perform any of the steps of any of the Group B embodiments.

Embodiment 53: The communication system of the previous embodiment further including the base station.

Embodiment 54: The communication system of the previous 2 embodiments, further including the UE, wherein the UE is configured to communicate with the base station.

Embodiment 55: The communication system of the previous 3 embodiments, wherein: the processing circuitry of the host computer is configured to execute a host application; and the UE is configured to execute a client application associated with the host application, thereby providing the user data to be received by the host computer.

Embodiment 56: A method implemented in a communication system including a host computer, a base station, and a User Equipment, UE, the method comprising: at the host computer, receiving, from the base station, user data originating from a transmission which the base station has received from the UE, wherein the UE performs any of the steps of any of the Group A embodiments.

Embodiment 57: The method of the previous embodiment, further comprising at the base station, receiving the user data from the UE.

Embodiment 58: The method of the previous 2 embodiments, further comprising at the base station, initiating a transmission of the received user data to the host computer.

At least some of the following abbreviations may be used in this disclosure. If there is an inconsistency between abbreviations, preference should be given to how it is used above. If listed multiple times below, the first listing should be preferred over any subsequent listing(s).

3GPP Third Generation Partnership Project
5G Fifth Generation
5GC Fifth Generation Core
5GS Fifth Generation System
AF Application Function
AMF Access and Mobility Function
AN Access Network
AP Access Point
ASIC Application Specific Integrated Circuit
AUSF Authentication Server Function
CPU Central Processing Unit
DN Data Network
DSP Digital Signal Processor
eNB Enhanced or Evolved Node B
EPS Evolved Packet System
E-UTRA Evolved Universal Terrestrial Radio Access
FPGA Field Programmable Gate Array
gNB New Radio Base Station
gNB-DU New Radio Base Station Distributed Unit
HSS Home Subscriber Server
IoT Internet of Things
IP Internet Protocol
LTE Long Term Evolution
MME Mobility Management Entity
MTC Machine Type Communication
NEF Network Exposure Function
NF Network Function
NR New Radio
NRF Network Function Repository Function
NSSF Network Slice Selection Function
OTT Over-the-Top
PC Personal Computer
PCF Policy Control Function
P-GW Packet Data Network Gateway
QoS Quality of Service
RAM Random Access Memory
RAN Radio Access Network
ROM Read Only Memory
RRH Remote Radio Head
RTT Round Trip Time
SCEF Service Capability Exposure Function
SMF Session Management Function
UDM Unified Data Management
UE User Equipment
UPF User Plane Function Those skilled in the art will recognize improvements and modifications to the embodiments of the present disclosure. All such improvements and modifications are considered within the scope of the concepts disclosed herein.

The invention claimed is:

1. A method performed by a wireless device for determining Transmission Configuration Indication, TCI, states for a plurality of transmission occasions, the method comprising:
   receiving a configuration, where the configuration comprises: (a) a list of TCI states; (b) a TCI activation command in activating a subset of the TCI states and mapping each of a plurality of codepoints of a TCI field in Downlink Control Information, DCI, to one or more of the activated TCI states where at least one codepoint is mapped to two different TCI states; (c) a downlink transmission scheme; a TCI-to-transmission-occasion mapping type; and (d) a time threshold;
   receiving in a time slot a scheduling message scheduling the plurality of transmission occasions;
   determining one or more time offsets between receiving the scheduling message and the plurality of transmission occasions by:
   determining a first time offset as the time offset between the reception of the scheduling message and a first transmission occasion and a second time offset as the time offset between the reception of the scheduling message and a second transmission occasion;
   determining a TCI state for each of the plurality of transmission occasions if at least one time offset of the one or more time offsets is less than the time threshold; and
   receiving the plurality of transmission occasions with the determined TCI states;
   wherein the first transmission occasion occurs earliest in time among the plurality of transmission occasions, and the second transmission occasion is an earliest transmission occasion after the first transmission occasion having a time offset equal to or greater than the time threshold.

2. The method of claim 1 wherein the scheduling message scheduling the plurality of transmission occasions comprises a Downlink Control Information, DCI, scheduling the plurality of transmission occasions.

3. The method of claim 2 wherein the DCI comprises a TCI field used to indicate one or more TCI states for the PDSCH transmission occasions.

4. The method of claim 1, wherein the plurality of transmission occasions comprise multiple Physical Downlink Shared Channel, PDSCH, transmission occasions.

5. The method of claim 1, wherein the multiple PDSCH transmission occasions are PDSCH repetitions over multiple time occasions according to the configured downlink transmission scheme.

6. The method of claim 1, wherein the downlink transmission scheme can be one of intra-slot PDSCH repetition and inter-slot PDSCH repetition.

7. The method of claim 1, further comprising:
   determining a first and second default TCI states based on the codepoint to TCI state mapping in the activation command.

8. The method of claim 1, wherein the first and second default TCI states are a first and a second activated TCI states associated with a codepoint with a lowest value provided in the TCI activation command.

9. The method of claim 1, wherein the first and the second default TCI states are applied to PDSCH occasions according to the TCI-to-transmission-occasion mapping type.

10. The method of claim 1, wherein if two default TCI states, the first and the second default TCI states, are determined, the first default TCI state and the second default TCI state are applied to the PDSCH occasions alternately every one or two PDSCH occasions starting from the first default TCI state and the first PDSCH occasion, where the PDSCH occasions are arranged in increasing order of time starting from the first PDSCH transmission occasion.

11. The method of claim 1, wherein the first and second default TCI states are applied to the PDSCH occasions alternately every one PDSCH occasion if the TCI-to-transmission-occasion mapping type is cyclic mapping or every two PDSCH occasions if the TCI-to-transmission-occasion mapping type is sequential mapping, starting from the first default TCI state and the first PDSCH occasion.

12. The method of claim 1, wherein if two TCI states, a first and a second indicated TCI state, are indicated in a Downlink Control Information, DCI, the first indicated TCI state and the second indicated TCI states are applied to PDSCH occasions alternately every one or two PDSCH occasions starting from the first indicated TCI state and the second transmission occasion.

13. The method of claim 10, wherein if two TCI states, a first and a second indicated TCI state, are indicated in a Downlink Control Information, DCI, the first indicated TCI state and the second indicated TCI states are applied to PDSCH occasions starting from the second PDSCH occasion in a same order as if the first time offset is equal to or greater than the time threshold.

14. The method of claim 1, further comprising:
    determining a default TCI states as a TCI state of a control resource set, CORESET, with a lowest index among one or more CORESETs in a latest slot the wireless device monitors PDCCH.

15. The method of claim 1, wherein if one default TCI state is determined, the default TCI state is applied to all PDSCH occasions.

16. The method of claim 1, wherein the first time offset is less than the time threshold.

17. The method of claim 16 wherein the first default TCI state is applied for the first PDSCH occasion and the second default TCI state is applied for the second PDSCH occasion.

18. A wireless device for determining Transmission Configuration Indication, TCI, states for a plurality of transmission occasions comprising:
    one or more transmitters;
    one or more receivers; and
    processing circuitry associated with the one or more transmitters and the one or more receivers,
    the processing circuitry configured to cause the wireless device to:
    receive a configuration, where the configuration comprises: (a) a list of TCI states; (b) a TCI activation command in activating a subset of the TCI states and mapping each of plurality of codepoints of a TCI field in Downlink Control Information, DCI, to one or more of the activated TCI states where at least one codepoint is mapped to two TCI states; (c) a TCI-to-transmission occasion mapping type; and (d) a time threshold;
    receive in a time slot a scheduling message scheduling the plurality of transmission occasions by being configured to:
    determine a first time offset as the time offset between the reception of the scheduling message and a first transmission occasion and a second time offset as the time offset between the reception of the scheduling message and a second transmission occasion;
    determine one or more time offsets between receiving the scheduling message and the plurality of transmission occasions;
    determine a TCI state for each of the plurality of transmission occasions if at least one time offset of the one or more time offsets is less than the time threshold; and
    receive the plurality of transmission occasions with the determined TCI states;
    wherein the first transmission occasion occurs earliest in time among the plurality of transmission occasions, and the second transmission occasion is an earliest transmission occasion after the first transmission occasion having a time offset equal to or greater than the time threshold.

* * * * *